United States Patent
McClements, IV

(10) Patent No.: US 9,495,713 B2
(45) Date of Patent: Nov. 15, 2016

(54) COMMENT DELIVERY AND FILTERING ARCHITECTURE

(75) Inventor: James Burns McClements, IV, Boulder, CO (US)

(73) Assignee: Quib, Inc., Boulder, CO (US)

( * ) Notice: Subject to any disclaimer, the term of this patent is extended or adjusted under 35 U.S.C. 154(b) by 883 days.

(21) Appl. No.: 13/323,622

(22) Filed: Dec. 12, 2011

(65) Prior Publication Data

US 2012/0150997 A1 Jun. 14, 2012

Related U.S. Application Data

(60) Provisional application No. 61/421,945, filed on Dec. 10, 2010, provisional application No. 61/432,395, filed on Jan. 13, 2011, provisional application No. 61/432,397, filed on Jan. 13, 2011, provisional application No. 61/439,189, filed on Feb. 3, 2011, provisional application No. 61/439,196, filed on Feb. 3, 2011.

(51) Int. Cl.

| | |
|---|---|
| G06F 15/16 | (2006.01) |
| G06Q 50/00 | (2012.01) |
| G06Q 10/10 | (2012.01) |
| G06Q 30/06 | (2012.01) |
| G11B 27/034 | (2006.01) |
| G11B 27/34 | (2006.01) |
| G06F 3/0484 | (2013.01) |
| G06F 17/24 | (2006.01) |
| H04N 21/4722 | (2011.01) |
| H04L 29/08 | (2006.01) |
| G06F 17/30 | (2006.01) |

(52) U.S. Cl.
CPC ............ *G06Q 50/01* (2013.01); *G06Q 10/101* (2013.01); *G06Q 30/0643* (2013.01); *G11B 27/034* (2013.01); *G11B 27/34* (2013.01); *G06F 3/0484* (2013.01); *G06F 17/241* (2013.01); *G06F 17/3082* (2013.01); *H04L 67/08* (2013.01); *H04N 21/4722* (2013.01)

(58) Field of Classification Search
CPC ...................................................... H04L 67/08
USPC ............................ 709/217; 725/37; 715/500
See application file for complete search history.

(56) References Cited

U.S. PATENT DOCUMENTS

| | | | |
|---|---|---|---|
| 7,735,101 B2 * | 6/2010 | Lanza et al. .................... | 725/32 |
| 2007/0234194 A1 * | 10/2007 | Tsuchiya et al. .......... | 715/500.1 |
| 2010/0100904 A1 * | 4/2010 | Kawakami et al. ............ | 725/37 |
| 2010/0318520 A1 * | 12/2010 | Loeb ................. | G06F 17/30056 707/743 |

* cited by examiner

*Primary Examiner* — Glenford Madamba
(74) *Attorney, Agent, or Firm* — Holland & Hart, LLP

(57) ABSTRACT

Methods, systems, and devices are described for associating comments with playback of media content. A central server computer system stores a plurality of comments received from a plurality of input devices, each comment being associated with a portion of the media content. The central server computer system receives a selection of the media content from an output device, identifies a subset of the plurality of comments associated with the media content based at least in part on a user preference received from the output device, and transmits the identified comments to the output device.

25 Claims, 23 Drawing Sheets

COMMENT DELIVERY AND FILTERING ARCHITECTURE

CROSS REFERENCES

The present application claims priority to the following patent applications: U.S. Provisional Patent Application No. 61/421,945, filed Dec. 10, 2010, entitled "DYNAMIC MULTIMEDIA COMMENT AND DISPLAY ARCHITECTURE"; U.S. Provisional Patent Application No. 61/432,395, filed Jan. 13, 2011, entitled "SYSTEM, DEVICE, AND INTERFACE ARCHITECTURE FOR COMMENT CREATION"; U.S. Provisional Patent Application No. 61/432,397, filed Jan. 13, 2011, entitled "SCREEN LOCATION COMMENT ARCHITECTURE"; U.S. Provisional Patent Application No. 61/439,189, filed Feb. 3, 2011, entitled "USER SELECTABLE COMMENT FILTER AND RELATED ARCHITECTURE"; and U.S. Provisional Patent Application No. 61/439,196, filed Feb. 3, 2011, entitled "COMMENT DELIVERY ARCHITECTURE," each of which is incorporated by reference in its entirety for all purposes.

The present application is further related to U.S. patent application Ser. No. 13/323,610, filed concurrently herewith, entitled "ASSOCIATING COMMENTS WITH PLAYBACK OF MEDIA CONTENT"; U.S. patent application Ser. No. 13/323,614, filed concurrently herewith, entitled "RECOGNITION LOOKUPS FOR SYNCHRONIZATION OF MEDIA PLAYBACK WITH COMMENT CREATION AND DELIVERY"; U.S. patent application Ser. No. 13/323,615, filed concurrently herewith, entitled "PARALLEL ECHO VERSION OF MEDIA CONTENT FOR COMMENT CREATION AND DELIVERY'; U.S. patent application Ser. No. 13/323,619, filed concurrently herewith, entitled "ASSOCIATION OF COMMENTS WITH SCREEN LOCATIONS DURING MEDIA CONTENT PLAYBACK"; and U.S. patent application Ser. No. 13/323,624, filed concurrently herewith, entitled "MEDIA CONTENT CLIP IDENTIFICATION AND COMBINATION ARCHITECTURE"; each of which is incorporated herein in its entirety for all purposes.

BACKGROUND

The present invention relates to the creation, storage, and distribution of commentary on media content.

Most people interact quite regularly with recorded media content, such as videos, music, books, and the spoken word. Modern society leans heavily on recorded media content to provide both entertainment and education. With the recent proliferation of portable media players, smartphones, tablet computers and the like, the demand for recorded media content continues to increase.

For many people, social interaction enhances the experience of viewing or listening to recorded media content. For example, the reactions and opinions of one's peers with respect to a certain film may increase that person's enjoyment of the film. In other examples, the perspective of a filmmaker or critic with a unique understanding of a particular film may, when shared, add greater meaning to one's perception of the film.

Often, a person consuming recorded media content may wish to share comments with other consumers of the recorded media content at present or in the future. Additionally, it may be desirable to incorporate comments generated by others with regard to specific portions of recorded media content into the experience of viewing and/or listening to the media content.

SUMMARY

Methods, systems, and devices are described for associating comments with the playback of media content, and for enabling the selective characterization and filtering of the comments associated with the playback of the media content.

In a first set of embodiments, a method of associating comments with playback of media content includes storing, by a central server computer system, a plurality of comments received from a plurality of input devices. Each of the comments is associated with a specific portion of the media content. The central server computer system receives a selection of the media content from an output device and identifies a subset of the plurality of comments associated with the media content based at least in part on a user preference received from the output device. The central server computer system then transmits the identified comments from the central server computer system to the output device.

In a second set of embodiments, a method of associating comments with playback of media content includes receiving, from a user at an input device, a comment and a selection of a portion of the media content. The user input device also receives characterization information generated for the comment. The comment is associated with the selected portion of the media content and the characterizing information generated for the comment.

In a third set of embodiments, a method of associating comments with playback of media content includes receiving a plurality of comments associated with the media content from a central server computer system at an output device. Each of the comments is associated with a specific portion of the media content. The output device identifies a current point during the playback of the media content and displaying to a user an indication of a subset of the comments of the plurality associated with the current point during the playback of the media content.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
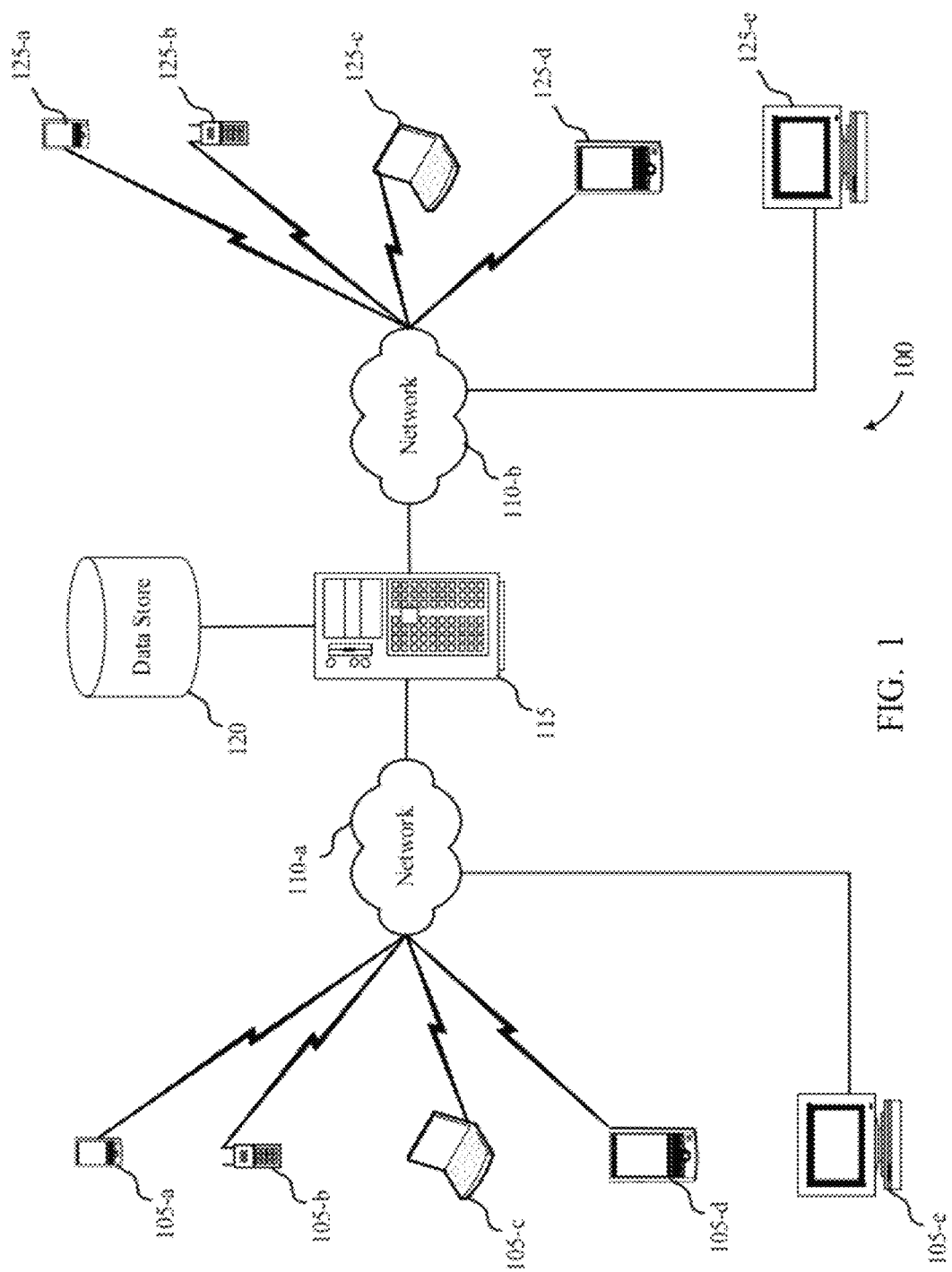
FIG. 1 is a block diagram of a system including components configured according to various embodiments of the invention.

Methods, systems, devices, and computer program products are described to create time, screen, and/or object location-specific comments on multimedia and other information content. A user interface allows a commentator to create a comment, associated with a time code or other locator, about the underlying media content. A central server computer system may compile, store, and distribute comments on the underlying media content from multiple commentators. Additionally, characterization information may be associated with one or more of the comments, and comments may be characterized and/or filtered based on the characterization information at the central server computer system, at an output device, or at an input device.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Systems, devices, methods, and software are described for the creation of commentary on multimedia and other information content. In one set of embodiments, shown in FIG. 1, a system 100 includes input devices 105 (e.g., mobile device 105-*a*, mobile phone 105-*b*, laptop 105-*c*, tablet 105-*d*, computer 105-*e*, or other computing devices), networks 110, central server computer system 115, data store 120, and output devices 125 (e.g., mobile device 125-*a*, mobile phone 125-*b*, laptop 125-*c*, tablet 125-*d*, computer 125-*e*, or other computing devices). Each of these components may be in communication with each other, directly or indirectly.

Time, screen, and object location-specific comments may be created for multimedia and other information content. A user interface of an input device 105 allows a commentator to generate a comment, associated with a time code, for example, relating to the content (which, for purposes of this disclosure, may be a movie, TV show, Internet and other video, book, article, song or other audio recording, photograph or other image, commercial advertisement, video game, immersive media, augmented or artificial reality media, the content contained in a comment, and/or other displayed content). The commentator may identify a screen location with the comment. The screen location may be modified or further defined as necessary to allow it to register a location within a 3D viewing environment. This created comment and associated screen location may be viewable to others watching the content in real time, or on a delayed basis. By using a time code, modified time code, or other locator or combination of locators as an external reference, along with a screen location, the comment need not actually be inserted into the multimedia, but may be called up from remote servers as the user reaches the applicable point. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof.

The comment may be stored locally (at the device 105, set-top box, or other storage device), or may be transmitted to the central server computer system 115 for cataloging and storage in data store 120. The central server computer system 115 may be made up of one or more server computers, workstations, web servers, or other suitable computing devices. The central server computer system 115 may be a cable or satellite headend. The central server computer system 115 may be fully located within a single facility or distributed geographically, in which case a network may be used to integrate different components.

Data store 120 may be a single database, or may be made up of any number of separate and distinct databases. The data store 120 may include one, or more, relational databases or components of relational databases (e.g., tables), object databases, or components of object databases, spreadsheets, text files, internal software lists, or any other type of data structure suitable for storing data. Thus, it should be appreciated that a data store 120 may each be multiple data storages (of the same or different type), or may share a common data storage with other data stores. Although in some embodiments the data store 120 may be distinct from a central server computer system 115, in other embodiments it may be integrated therein to varying degrees. The created commentary may be integrated into the underlying multimedia or other information content, or may be stand-alone content to be leveraged with technology allowing the time stamps to sync with the content as it is played.

The user may be alerted to the existence of a comment during playback of the content by the appearance of a viewing pane or a screen location or screen area-specific icon that can be touched or clicked on output device 125, to reveal its contents. In other examples, the content and commentary may be separated. Users may tailor their experience by selecting certain commentators, types of commentators, types of comments, and/or screen locations.

The components of the system 100 may be directly connected, or may be connected via a network 110 which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

The following description describes various aspects and options for the system. In the discussion below, the comments may be referred to as comments. Comments, as used herein, are to be interpreted very broadly. Comments may be created, and associated with screen locations, by users using input devices 105. Comments, and associated screen locations, may be viewed and controlled by users using output device 125. An input device 105 may be an output device 125, as well. Comments may be stored and organized in data store 120. Each feature is set forth for purposes of example only, and may be included or excluded in various embodiments.

A variety of interfaces may be used for comment creation. A commentator may use these interfaces to input a comment into a movie or other media item and to have that comment viewable (if the comment is marked public) to anyone else viewing or experiencing the media. By using a modified time code and screen location as an external reference, the comment may not actually be inserted into the media or into any metadata, but may be called up from a remote server as a viewer reaches that point in the media. There may be an uninterrupted feed by anticipating and pre-loading any upcoming comments. The user may be alerted to the existence of a comment during media playback by the appearance of a comment icon on the screen that can be touched or clicked to reveal its contents.

There are a variety of grid- or coordinate-based architectures that may be employed for screen location input and viewing. Alternatively, objects or images may be selected within an image. A variety of techniques are known in the art to select objects in an image based on color, brightness, and/or deviations. Shrink or expand controls may be used for object selection, as well. Within both 2D and 3D environments objects may be selected using techniques that may, for example, allow a user to select and associate a comment with a figure that is blocked by another object at the desired moment of comment insertion. This may be handled, for example, via a system that allows the user to scrub forward or back, select the figure, and return to the desired comment insertion point. In 3D environments, a comment location may be defined by elements particular to the 3D environment, such as a view pane within the image that is a certain apparent distance from the camera, or a region associated with a specific depth of field. A comment location may be similarly defined in 2D and 3D light field photography and video, and in such examples comment delivery may be based on a user's access to certain fields of view or focus. A comment location may be defined in non-visual media such as music by way of visualizations that may, for example, allow a comment to be placed in a particular tonal area or in an area representing a particular instrument. For playback, a variety of techniques may be used to indicate that comments are in a specific location. An icon may be shown for each comment, or an icon can be shown with different transparencies to illustrate the number of comments. Objects may be controlled to glow, shimmer, or have different color features when comments are made. Objects not currently in view because they are blocked may be estimated or interpolated to show their approximate location and allow them to indicate their relevance to an associated comment. Users may control this so they can set the noise level for given content.

Figure 2A:
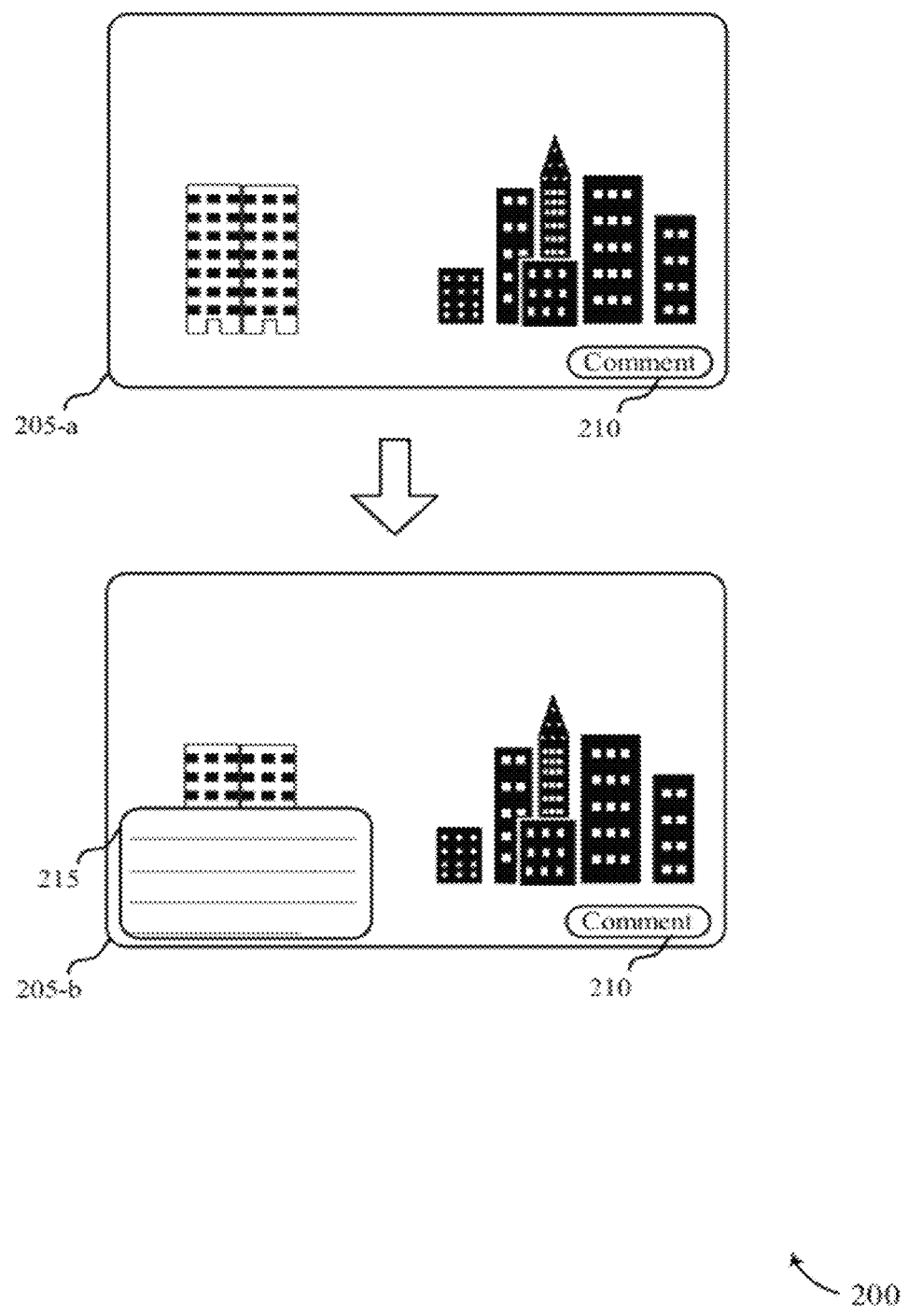
FIG. 2A is a block diagram of an example display according to various embodiments of the invention.

Thus, in one embodiment, there may simply be a time marker, screen location indicator, and associated text for a given piece of content. This may be stored separately and independently from the underlying content. FIG. 2A illustrates an example block diagram 200 of a display 205 with an interface for making comments. The display 205 may be on, or integrated with, a mobile device, mobile phone, laptop, tablet, computer, television, head-mounted display, remote control, or any number of other computing or viewing devices. The display 205 may be a touch screen or be controlled by user inputs into a remote, peripheral, or other mobile device. In the illustrated display 205, the locate comment icon 210 is overlaid on the content. However, in other embodiments, the interface may be independent or on another screen or window from the content.

Display 205-a illustrates the interface at Time1, with a locate comment icon 210. A user may click on, or otherwise select, the locate comment icon 210. Display 205-b illustrates the interface at Time2. A comment entry window 215 appears in response to the selection of the comment icon to allow the user to comment via text entry and select a screen location for the user.

A user may set a screen indicator icon to display for a preset, or configurable, period. A user may set in and out points so that an entire scene can be referenced by the comment. This may allow the user to 'capture' the scene completely for reference and for playback or sharing. The user may set the icon to display at the beginning and end point, and to, optionally, display a scene marker during the span of the scene. This scene marker may be distinguishable from the standard comment marker.

As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments may be made by speaking, and the comment may be replayed during play of the underlying content. Alternatively, there may be speech to text conversion for making comments, and text to speech conversion for listening to comments. A user may insert a video of himself or herself with speech commentary, or other video may be inserted. Comments may be placed in specific locations on the display 205. There may be different pre-caching procedures and timing considerations used for different media. Because of the substantial memory and bandwidth requirements of video, more delay may be tolerable for video comments. Only the front end need be pre-cached in some embodiments, and the remainder may be downloaded once the video comment is selected for play.

Comments from a number of users may be linked or otherwise integrated to create a comment set. A user may insert video, graphical, or audio overlays designed to be used simultaneously with media content rather than in separate or separable panes so that the media is augmented or fully joined by the message content. Comments may contain software applications that allow or trigger various actions within local or remote devices, software systems, or devices and systems within and outside the control of the user or the company or entity delivering these services. In this way, a comment can control local devices, for example, to reduce volume in one viewing pane or pause or slow the media, or provide other services to the user or other entities. Comments may be used, for example, to control or administer micropayment systems for media or premium commentary. Comments may contain a hyperlink to points outside the comment systems and they also may contain a link to or an association with a comment within the comment system or they may contain several potential links offering user a choice of links to media, media subunits and other comments in the form of a question, quiz, survey, or other device such as a software player that can link the comments and play the resulting media and meta-media. Comments and link-containing comments may be daisy chained, or linked in a hub-and-spoke or other such arrangement to provide unique ways for users to move through media or through portions of media.

Comments may be inserted as header comments designed to appear to subsequent users in a viewing pane associated with a point at the very beginning of the media and to contain general commentary about a piece of media not tied to a particular point on a timeline. Comments may contain messaging devices to allow the user, automatically or not, to send a message directly to another user or entity. Comments may include a device to exclude any user response from the public commentary or message stream so that it is viewable only as a private comment or message. Comments may have special status and functionality as super comments that allow individuals and entities, for example a wiki service, to capture and distill various comments in a single comment or an ordered collection of comments, which can then be further vetted and augmented. These super comments also may be filterable into collections of commentary that match a user's interests and sensibilities. Various comment types and combinations may be clearly marked with symbols, colors or other methods to alert users to their capabilities and limitations.

Figure 2B:
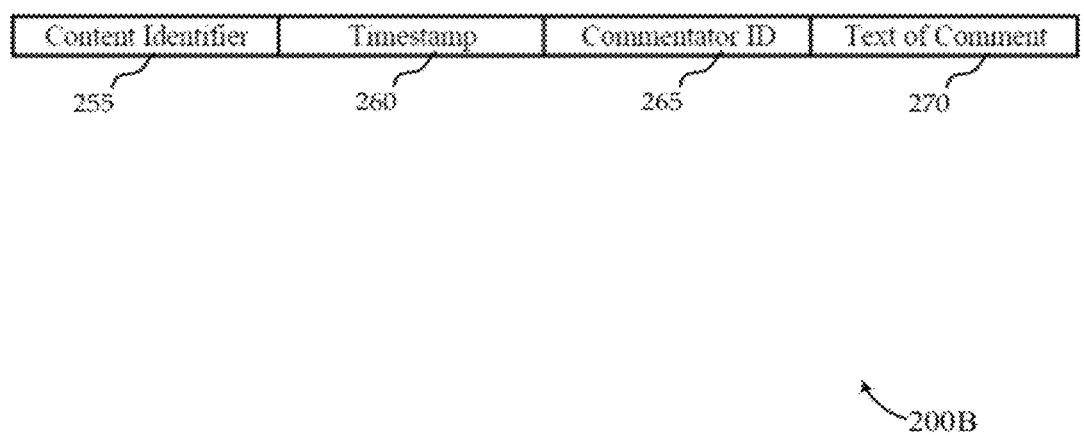
FIG. 2B is a block diagram of an example display according to various embodiments of the invention.

Referring to FIG. 2B, a block diagram 200B illustrates the type of information that may be transmitted from an input device 105 to a central server computer system 115, and stored in a data store 120 (e.g., in the system 100 of FIG. 1) when a comment is created. In the illustrated example, an input device may 105 may transmit a content identifier 255 (e.g., any number or alphanumeric character which identifies the media content to which the comment applies; a timestamp 260 indicating the time and/or location in the content where the comment was placed; a commentator ID 265 (e.g., any number or alphanumeric character which identifies the commentator); and the text of the comment 270. In one example, therefore, a data store 120 may catalog received comments using the above information.

Figure 3A:
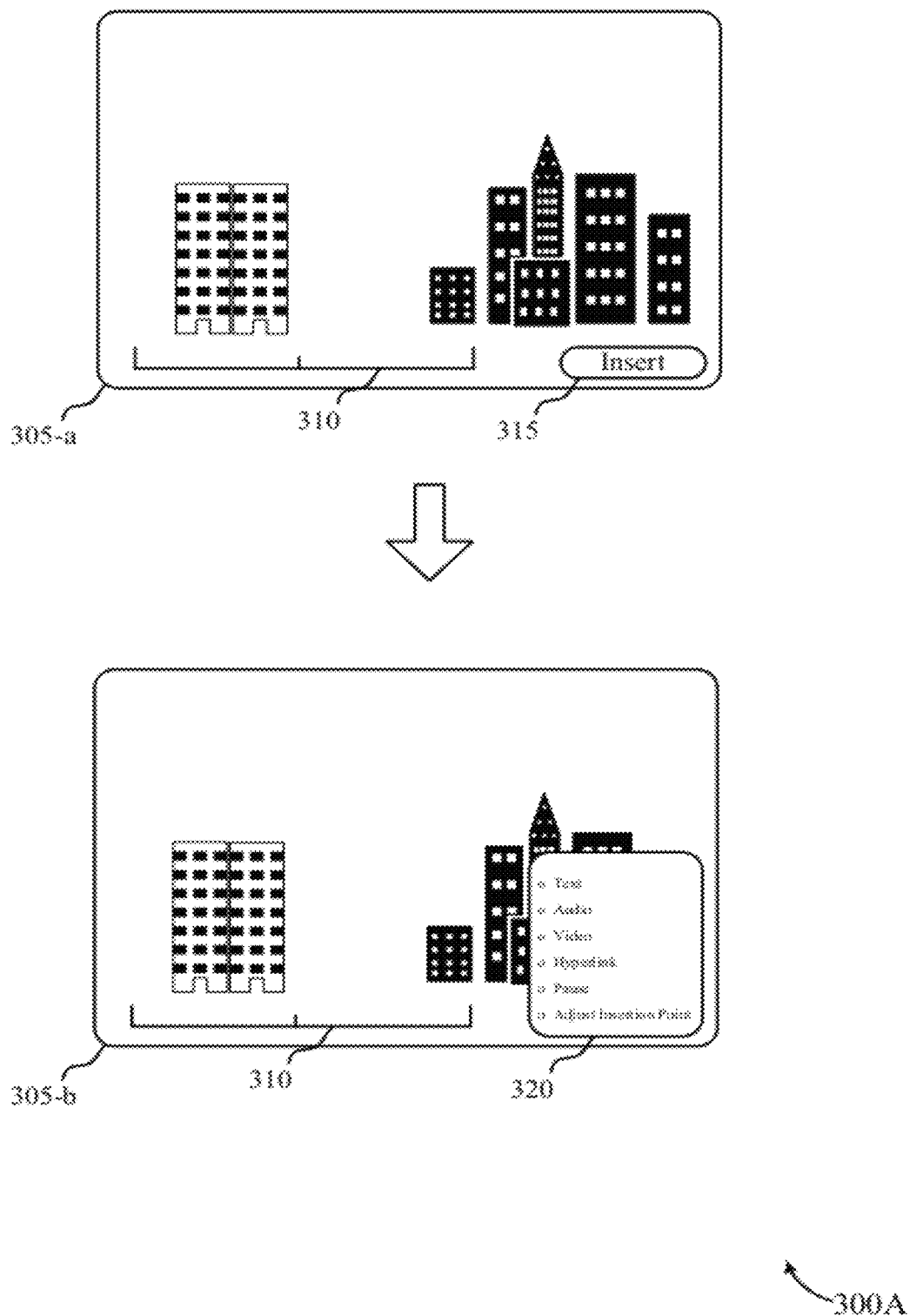
FIG. 3A is a block diagram of an example display according to various embodiments of the invention.

FIG. 3A illustrates an example block diagram 300A of a display 305 with an alternative interface for making comments. This display 305 may be an example of the display 205 described with reference to FIG. 2A. The display 305 may be on, or integrated with, a mobile device, mobile phone, laptop, tablet, computer, television, head-mounted display, remote control, or any number of other computing or viewing devices. The display 305 may be a touch screen or be controlled by user inputs into a remote, peripheral, or other mobile device. In the illustrated display 305, an insert icon 315 and scrubber control 310 are overlaid on the content. However, in other embodiments, the interface may be independent or on another screen or window from the content. The scrubber control 310 allows a user to control the underlying media, control the insertion of comments, set the timing of comment display, set the duration of the media subunits captured by the comment, zoom into the media time line, and other functions.

Display 305-*a* illustrates the interface at Time1, with an insert icon 315 and scrubber control 310 overlaid on the content. A user may use the scrubber control 310 to identify the proper place for comment insertion, and then may click on, or otherwise select, the insert icon 315. Display 305-*b* illustrates the interface at Time2. A comment type window 320 appears in response to the selection of the insert icon 315 to allow the user to comment via text, audio, video, animation, or hyperlink or other methods, insert a pause, and adjust the insertion point. In addition, the user can further select the "locate" option for the ability to associate the selected option (e.g., text, audio, video, animation, or hyperlink) with a specific screen location. The timing of each pre-caching may depend on the location of the comment (within a screen or tied to an object) or the comment form (e.g., text, audio, video, or hyperlink).

Figure 3B:
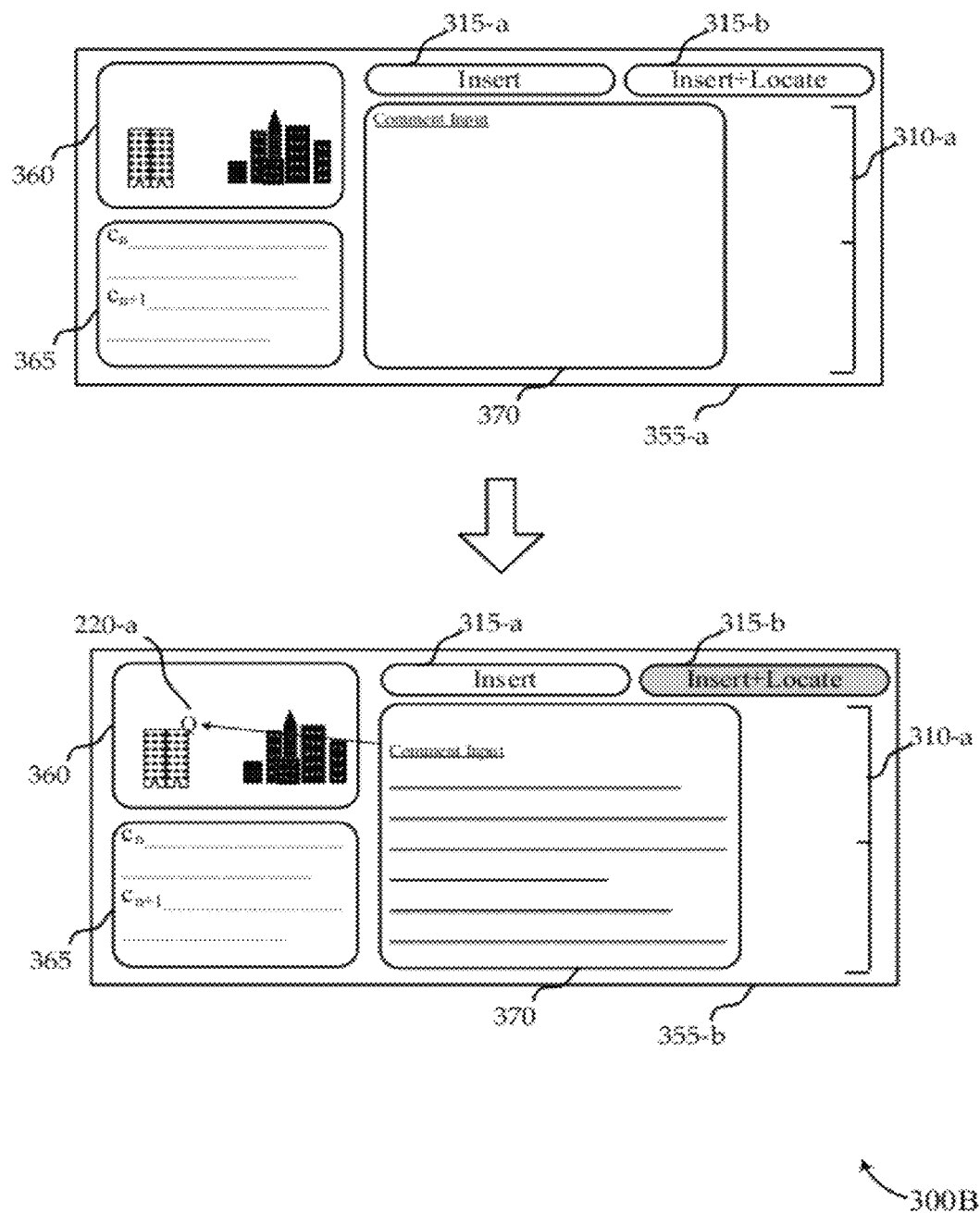
FIG. 3B is a block diagram of an example display according to various embodiments of the invention.

FIG. 3B is a block diagram 300B of a display 355 with an alternative interface for making comments. This display 355 may be an example of the display 205 described with reference to FIG. 2A. The display 355 may be on, or integrated with, a mobile device, mobile phone, laptop, tablet, computer, television, head-mounted display, remote control, or any number of other computing or viewing devices. The display 355 may be a touch screen or be controlled by user inputs into a remote, peripheral, or other mobile device. In the illustrated display 355, an insert icon 315-*a*, insert and locate icon 315-*b*, scrubber control 310-*a*, content window 360, comment stream from other commentators 365, and comment entry window 370 are in different windows within the display 355. However, in other embodiments, each interface may be overlaid or integrated or on a screen, or some subset of this functionality may be on a different device.

Referring to the display 355-*a* at Time1, a user may use the scrubber control 310-*a* to identify the proper time for comment insertion, and then may click on, or otherwise select, the insert icon 315-*a* to insert a general (non location-specific) comment. The user may click on, or otherwise select, the insert and locate icon 315-*b* to insert a location specific comment. This display configuration allows a user to view the underlying content via content window 360 (and perhaps look at other location specific comments (not shown)). A user may view the comment stream 365 (perhaps screen location-specific comments or otherwise filtered), and input comments into the comment entry window 370. In some examples, comments from the comment stream 365 may be dragged and dropped into the comment entry window 370, or otherwise selected for a comment set or other use. There may be threaded discussions, or comments from others may be pulled in.

The display 355-*b* at Time2 illustrates an example of when a user has clicked on, or otherwise selected, the insert and locate icon 315-*b* to insert a location-specific comment. A location indicator 220-*a* (here marked by a "Q") shows the user selected screen location that will be associated with the comment.

The system architecture for location-specific comment creation and viewing may take on a variety of forms. In some examples, DVD, broadcast, or streaming content may be received on a computer, set top box, or television. A user interface control (e.g., the control functions of the configurations illustrated in FIG. 2A, 3A, or 3B) may be in the same screen, but distinct from the content (e.g., overlaid, or in separate windows) for either creating or viewing comments. The user interface control and the content may be on different devices. The user interface control may use various mechanisms to associate a timestamp and screen location with the entry of a comment. In different embodiments, the user interface control may be integrated with content to varying degrees. The control window may receive inputs via a remote control, mobile device, keyboard, or other peripheral. The user interface control may control underlying media content (i.e., pausing the underlying media content), or not, and the user interface control may convey the underlying content to other devices for viewing while retaining player control and other functions.

Time, screen location, and object-specific comments may be created for the content. A user interface control of an input device allows a user to generate a comment, associated with a time code and screen location. By using a time code and screen location indicator as an external reference, the comment need not actually be inserted into the multimedia. The user interface control may be generated locally or served from the central server computer system. A user interface control of an output device allows a user to view a comment associated with a time code and screen location.

In one example, the content stream and user interface control are independent and distinct from each other (even when both are on the same display). In other embodiments, the content stream and user interface control are overlaid or partially integrated, and the placement location of the icon for a comment may be overlaid on the screen itself. In still other embodiments, the content stream and user interface control are tightly integrated.

The term "screen location," and other like terms, are to be construed broadly. For example, instead of choosing a specific location on the screen, a user may select an object or area to be associated with a comment. By selecting an object (for example, a person), the comment may move with the object within the screen.

Figure 4:
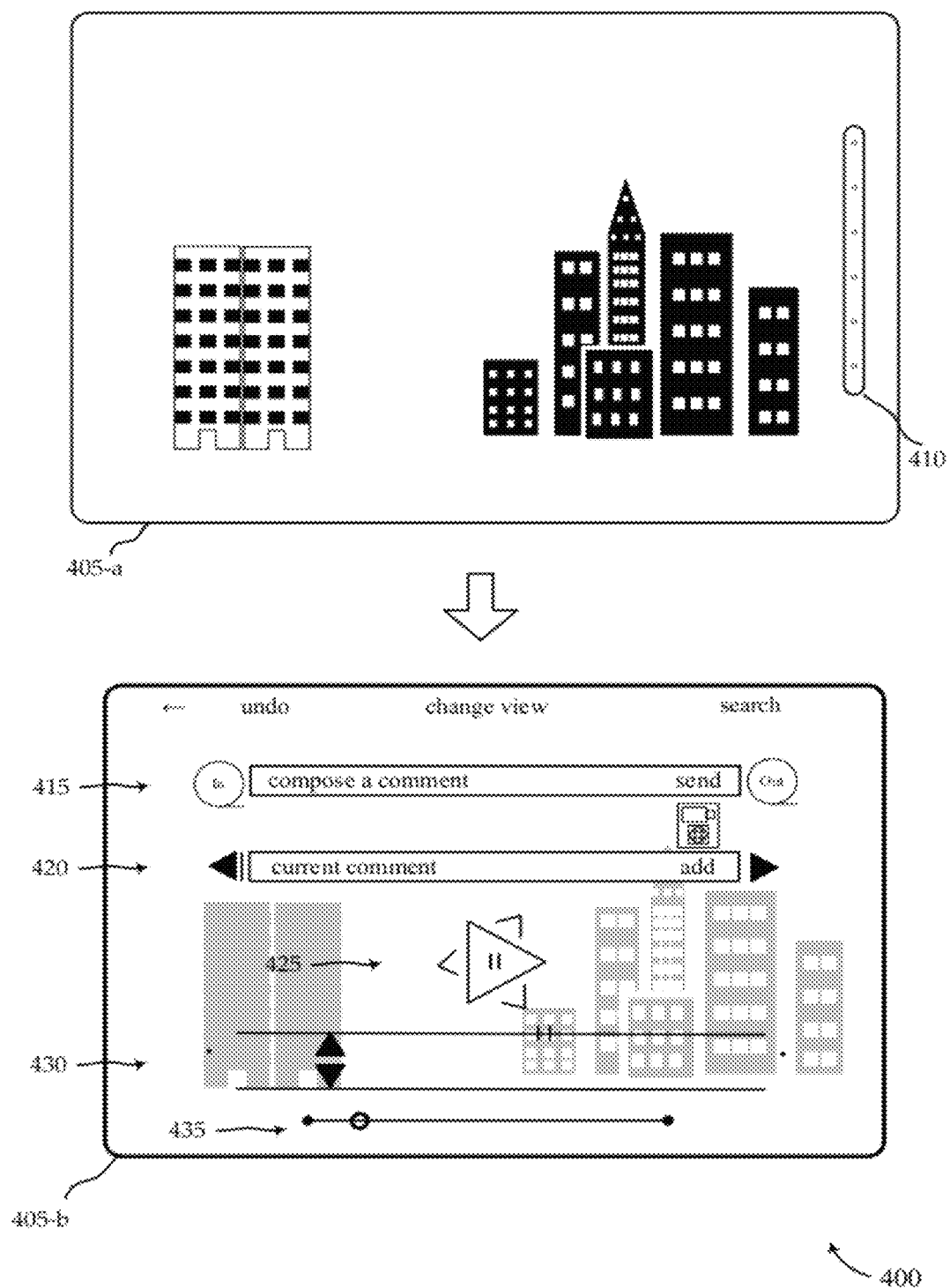
FIG. 4 is a block diagram of an example display according to various embodiments of the invention.

FIG. 4 illustrates an example block diagram 400 of a display 405 with an alternative graphical overlay system for making, and viewing, comments from a single interface or set of interfaces. This display 405 may be an example of the display 205 described with reference to FIG. 2A. The display 405 may be on, or integrated with, a mobile device, mobile phone, laptop, tablet, computer, television, head-mounted display, remote control, or any number of other computing or viewing devices. The display 405 may be a touch screen or be controlled by user inputs into a remote, peripheral, or other mobile device.

Display 405-*a* illustrates the interface at Time1, with an array of circles 410 (which may be referred to as category beacons) overlaid on the content. These beacons 410 may each represent a type of comment or a category, or a comment source or source category and each beacon may light up as the video passes a point at which a comment has been inserted. If a beacon 410 is pressed and held, the comments filtered by category may be shown. The beacons 410 may show a steady glow for comments that capture a media clip or subunit, with increasing brightness when multiple commentators have chosen the subunit or portions thereof. Regular comments show as brief pulses. By tapping, or clicking on, any of these buttons the category may be displayed. By pressing and holding, the user may be taken to a comment viewing window (not shown) that has been filtered by the category. The user can navigate sideways to other comment windows in other categories, and vertically to comment windows filtered by type or category of comment (e.g., "humorous," "cinematography," etc.). Certain aspect ratios (not shown) may allow some of the components illustrated to be displayed below the video field by user preference. Letterbox video may be shifted to the very top of the display to provide more room below. A window of comments may be displayed on one or more multiple lines, or in combination with other modular windows, such as a graphic to show traffic in the comment stream.

Display 405-*b* illustrates the interface at Time2. A user may select the option of having a graphical overlay appear, allowing the user to have controls to view comments, write a comment, scrub to comment insertion points, and other tasks. The graphical overlay may include a compose comment 415 set of features, and a current comment 420 set of features.

The compose comment 415 bar may be tapped, and the bar may expand to two lines and continue to expand as text is added. Below 'send,' on the second line is a pair of icons for audio and video recording of the comment. 'In' may be tapped to insert the comment at the current location in the media. It is not necessary to set an out point, but one can be set by scrubbing to the desired location in the media and pressing the 'out' button. The 'send' feature provides sending options such as 'send as a Tweet,' 'send to Facebook,' 'send as a message,' as well as an option to 'splice' this comment to another in a comment document, using a splice or linking comment to connect them.

The current comment 420 bar shows the most recent comment passed in the timeline. 'Current comment' may be tapped to view the entire comment. 'Current comment' may be pressed and held to go to a comment viewing window. A small vertical line to the left of the current comment shows when the current media has been captured within a comment clip, and gives a rough indication when more commentators also have chosen the current scene. The triangles at either end of the bar can be tapped to move forward and back through the comment timeline. 'Add' is a thumbs up, adding the comment to the user's set of comments that will be passed along to others.

In this example, there is also a unified play, pause, and reverse button 425. The button 425 may be designed to use a single control for media and other content windows. The default mode may be forward mode. A user may tap once to play, tap again to pause, tap again to play, and so on. From a paused state, a user may press and hold for 1 second (or other time period) to play in reverse (indicated, for example, by an audible sound, 1×). A user may tap to pause, tap to play in reverse, tap to pause. From a paused state in reverse mode, a user may press and hold for 1 second (or other time period) to play in forward mode. Tapping pause and play continues to advance media forward. A user may press and hold again for reverse mode. There may also be fast forward and reverse. In either forward or reverse mode, at play or reverse play speed, a user may press and hold the play button (e.g., holding for 1 second for 2× speed, holding for 2 seconds for 4× speed, and tapping to pause)

There may also be a split scrubber 430 that lets the user scan the media and the comment stream simultaneously, and to have control of each individually. To insert or view comments, a user slides a pair of triangle markers along a double timeline and finds a desired location. The top scrubber controls the media (when the media window is on top or to the left) and the bottom scrubber controls the comment stream below or to the right. The wide space between the lines controls them both simultaneously. Scrubber marks may disappear during finger (or cursor) swipe manipulation between the lines.

As the triangles are moved, they may change color or shading. This allows the user to be aware of a change in their position on the timeline when their movement would not otherwise be obvious. If the triangles are synchronized, the triangles may change color together, remaining the same color. If the triangles are out of synch, they may each change to different colors. This may help make the user aware that the user is out of synch when the distances on the timeline would not otherwise make it obvious.

With the split scrubber 430, a user may scan media and comments independently and quickly return the media to the place where it was paused. By tapping (or clicking) one or another of the relevant triangle markers, the user can choose to have the media resynchronized to the timeline location of either the media or the comments window. The user may also resynchronize by initiating play in the appropriate window. Aside from scanning and browsing, the split scrubber 430 may be used to change the insertion point or in/out points of a comment. The user may select a comment in the message window that he or she previously wrote, and after adjusting the media in the other window to the appropriate point, click the in or out icon, or click and drag the comment onto the media.

The split scrubber 430 also may be of use with other combinations of viewing windows, such as media and comment document windows, or comment and comment document windows. The split timeline may also be augmented with a third or fourth timeline to control multiple windows. The split scrubber 430 may also display the in and out points of the current comment if the comment pertains to a media clip (as opposed to a comment that has a single insertion point). It also may contain a space, for example, between the two lines, in which a finger swipe in either direction may advance the media to fine tune a location. It may contain points at either end that can be clicked or tapped to advance or reverse the media one frame at a time or advance or reverse the comment stream one comment at a time. These points may additionally be controlled by pressing and holding them to advance media in gradual acceleration up to 4×, for example. Fine control of this acceleration may be handled by a series of press/hold maneuvers, such as one press/hold for 1× speed and two press/holds for 2×. The split scrubber 430 also may be used to improve the speed of certain user operations when the system is unable to keep up with both media and commentary streams and when decoupling is desired.

A fine tune scrubber bar 435 may consist of a line within a window (horizontal or vertical) designed to focus finger swipe motions into a specific zone or to be manipulated by mouse control. It may be used without split scrubber 430 (e.g., it may be used in configurations in which use of a split scrubber 430 could lead to confusion or in which the split scrubber is too bulky). In some examples, a fine tune scrubber bar 435 may be used with each window with timeline-related elements, such as media and commentary, served by its own scrubber. Manipulation of one window may control both windows unless the synchronization of these windows is decoupled. Windows may be decoupled by pressing and holding one window while manipulating the scrubber of another. The windows can be resynchronized by initiating 'play' in either window, which synchronizes play to the chosen window. The disappearing scrub marker described herein may also have the capability of splitting into top and bottom halves so that this scrubber can be used as a less obtrusive split scrubber.

A fine tune scrubber bar 435 may be swiped from right to left, for example, to advance the media or commentary forward in the timeline. Rapid and repeated swiping may trigger the appearance of a marker indicating speed, such as 2× or 4×. It may also trigger the appearance of a scrub marker that shows progress along a timeline. When these markers appear, it may be a signal to the user to stop swiping and allow the content to continue at that speed to a desired point, or manipulate the markers to move a greater distance. A tap may again pause the content so that it can be fine-tuned by finger swipe. Pressing and holding a midpoint of the line may also trigger the display of the scrub marker and allow it to be manipulated to move greater distances in the timeline and to its beginning or end. This marker may disappear when the user makes further fine tune swiping motions. Tapping either end of the line may allow the user to advance frame by frame or comment by comment depending on the window. Pressing and holding one end of the line may increase scrubbing speed by successive increments, accelerating the speed from 2× to 4×, for example. This may work whether or not the scrub marker is visible, though it may also cause the scrub marker to appear so the user is aware of motion in the timeline. Releasing this may cause the window's content to pause again, or it may continue at that speed until the window is tapped to pause it. Further swiping may return the user to fine adjustments.

This scrubber bar 435 also may show fine movement in the disappearing scrub marker(s) by changing the color of the marker and the marker halves in the same manner as the split scrubber. These scrub markers may also be manipulated in the manner of the split scrubber above to decouple media from other windows and, by pressing and holding one or the other, resynchronizing to the timeline of the desired window.

There may also be browse scrubber functionality. Browse mode may be activated by pressing and holding a point in the media or comment window. Both may pause as soon as one is touched. Now either window may be manipulated by horizontal finger swipes to scrub the media and the comment stream forward and reverse. Rapid swiping in one direction (e.g., three times) may increase the speed of scrubbing and trigger the display of an optional simple scrubber bar and marker that can be manipulated to move greater distances in the timeline. If the optional simple scrubber bar is not manipulated, it may disappear after a short interval. If it is manipulated, once a finger is lifted from the scrubber, it may disappear and finger swiping may be automatically reactivated. While this swiping tool may default to simultaneous and synchronized viewing of both windows, the windows may be decoupled by manipulating one window with a swipe while pressing and holding the other. Once decoupled, the held window no longer needs to be held, and it stays in its position in the timeline.

In browse mode, there may be one screen anchored in a position in the timeline if the user hopes to return both windows to this original location to continue a viewing session. When it is time to resynchronize, the user can press and hold the window that is currently at the desired location, and the windows are synched. This mirrors a similar operation on the split scrubber in which the windows are resynchronized by pressing and holding the triangle marker associated with the window that is in the desired timeline position. If a user mistakenly presses the wrong window, the undo command may return the windows to their previous positions. The interface also may contain a command that can return the media to its previous viewing position(s) in case many user actions have transpired since the viewing session was interrupted. This command may be a second tier option of the undo command.

Browse mode may also allow the user to manipulate the media and comment screens vertically. Vertical strokes in the media window may move through other media in the queue or its sub-queues or through other comment projects underway. Pressing and holding points at the top and bottom edges of the window may move through sub-queues and other of these categories. This vertical movement may be helpful when the user is working across media to link scenes, create timeline-independent comment sets, build annotated music playlists, or create other commentary/media documents. It also allows a user to switch gears and enjoy other media.

The comment window may continue to display commentary from the first media until the user presses and holds the media window to synch commentary to that media and location on the timeline. Vertical strokes in the comment window move the window through the current list of comments arranged in timeline order, and each comment is expandable with a tap. Pressing and holding points at the top and bottom edges of the window may move through categories and classes of commentary so the user can view comments on a certain topic or of a certain type, such as humorous. Vertical movement in the comment window may be used in conjunction with horizontal movement to find a category (vertical movement to 'acting') and then move horizontally to select a type of comment, such as humorous, to display humorous comments about the acting. In windows or operations that benefit from diagonal movement, such as forms of a comment document builder, finger swipes can move screen objects diagonally and may move through matrices diagonally as well. Matrices and other mapping devices may also be viewed and navigated via other constructs in a 3D or simulated 3D environment, and the element of movement through time may add a fourth dimension to this navigation.

Browse mode may be further augmented with controls that allow the user to tap the edges of a viewing window to control incremental movements. In the media window, for example, a tap to the right edge (or a specifically marked spot on the edge) may advance the media one frame. In the message window, a similar tap may advance the comment stream by one comment. Taps on the top and bottom edges may advance the media window through the queue or sub-queues, and move the comment window through the comment categories. Pressing and holding these edges or marks may move the material in the window to its beginning or end point, such as the end of a media. Finger swiping may be augmented or substituted by comparable mousing controls, such as clicking and dragging within a control bar, or with eye movements, such as two rapid glances toward one edge of the screen when a specific viewing window is selected.

Figure 5:
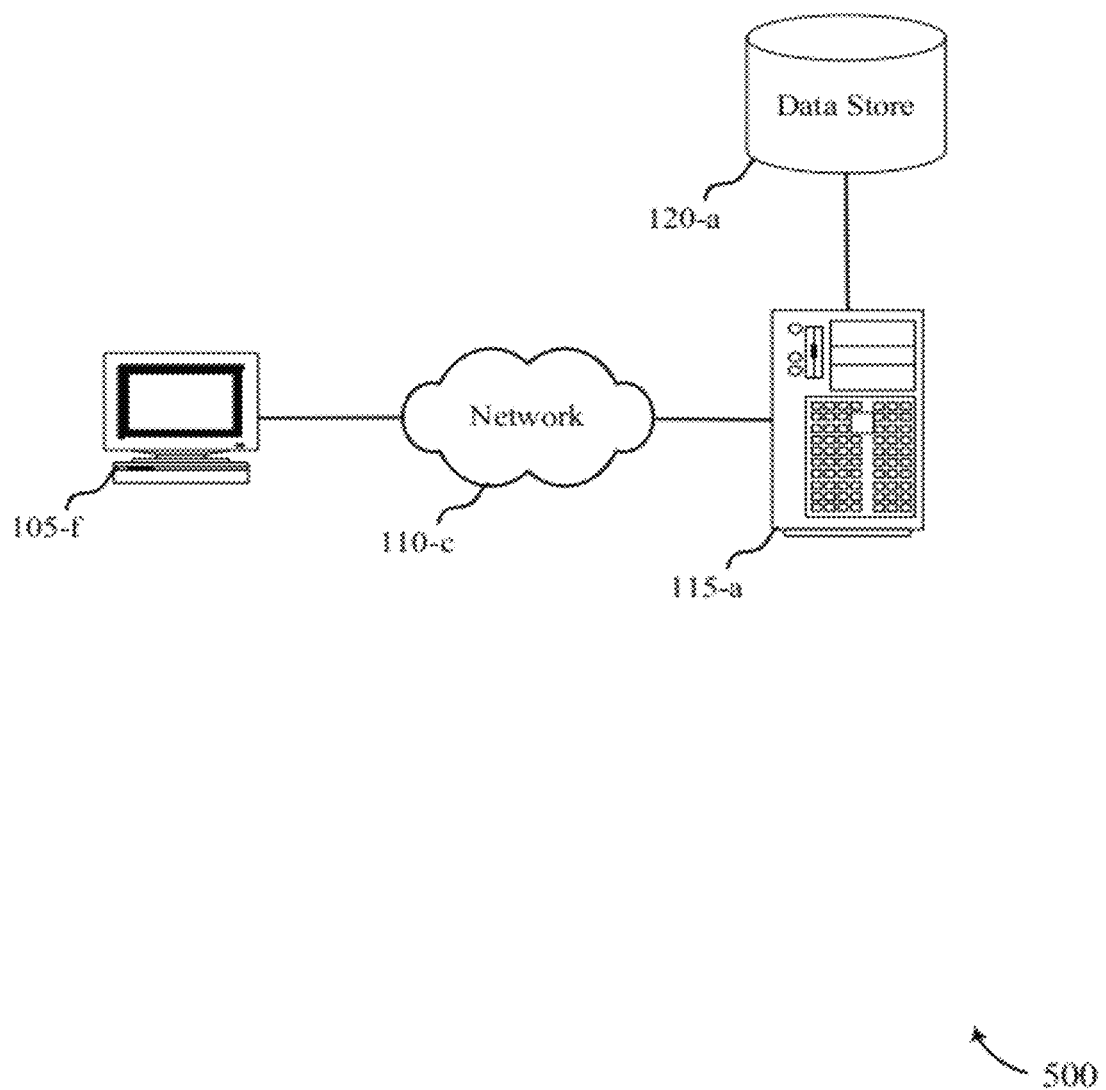
FIG. 5 is a block diagram of an example system including components configured according to various embodiments of the invention.

In one set of embodiments, shown in FIG. 5, a system 500 includes input device 105-*f* (e.g., a computer or television), network 110-*c*, central server computer system 115-*a*, and data store 120-*a*. Although in this case the underlying content is accessed from the central server computer system 115-*a*, the underlying content may be accessed from a local source (e.g., DVD or other locally stored multimedia). This system 500 may be the system 100 of FIG. 1. Each of these components may be in communication with each other, directly or indirectly.

The central server computer system 115-*a* may stream, or otherwise transmit, video data (or other information data) to the input device. This content may be accessed from data store 120-*a*.

Time, screen location, and object-specific comments may be created for the content. A user interface control of an input device 105-*f* allows a user to generate a comment, associated with a time code, for example, relating to the content (which, for purposes of this disclosure, may include a movie, TV show, Internet and other video, book, article, song or other audio recording, photograph or other image, commercial advertisement, video game, immersive media, augmented or artificial reality media, the content contained in a comment, or other displayed content). By using a time code, modified time code, or other locator or combination of locators as an external reference, the comment need not actually be inserted into the multimedia. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. The user interface control may be generated locally, or served from the central server computer system 115-*a* to the input device 105-*g* via network 110-*c*.

In one example, the content stream and user interface control are independent and distinct from each other (even when both are on the same display). In other embodiments, the content stream and user interface control are overlaid or partially integrated. In still other embodiments, the content stream and user interface control are tightly integrated. The following examples further illustrate the options.

The central server computer system 115-*a* may receive comments and data associated therewith, and store the information on the data store 120-*a*. In some embodiments, the central server computer system 115-*a* simply stores the received information. In other examples, the central server computer system 115-*a* evaluates other comments by commentator, evaluates language in the comment (profanity, etc), and generates initial characterization information for association and storage with the received comments. As peer reviews come in, and reviewer ratings evolve, the central server computer system 115-*a* supplements and crafts the characterization information associated with specific comments within the data store 120-*a*.

The central server computer system 115-*a* may automatically generate characterization information on comments and commentators. However, users may characterize their own comments, and those of others, as well. Keywords are commonly used words used to characterize types of comments and commentators. Keywords may be used to match and cross-reference with categories chosen by users. Keywords may be used to test and improve characterization. Keywords may be analyzed in responses triggered by a comment. Keywords may be cross-referenced to known characteristics of user and profiles. Keywords may be used to cross-reference to characteristics of a user's favorites, friends, or group. Sentiment and language analysis and other such tools may also be used to characterize comments and commentators, and user-made associations among comments may also be used to characterize. Additional characterization may be available for advertisements, and commercial comments to assess senders and the quality and usefulness of commercial commentary. Characterization may be used to assess audience receptiveness and optimal audiences, and track user tolerances.

The central server computer system 115-*a* may analyze ratings and rankings of comments by other users and assess positive/negative feedback. The assessed weight of a user's rating of a comment may depend on the user's ranking and profile, and also to characteristics or rank of users who ranked the user or the user's comments. The central server computer system 115-*a* may assess responses and discussions that comments have triggered, and cross-reference to number and frequency of responses, and character of responses and responders.

The data store 120-*a* may be formatted to allow a user or the system to identify high quality commentary that is not necessarily popular. The central server computer system 115-*a* may analyze combinations of categories to assess patterns, and analyze connections such as splices and associations that people make among media and clips. Automatic meta-media mapping or automatic and assisted meta-media creation may be based on these connections.

Thus, in some examples, the data store 120-*a* may simply store a content identifier, timestamp, text, and reviewer. In other examples, the data store 120-*a* may store additional information, such as the self-identified commentator group, comment/text characterization information, commentator characterization information, user-made associations among comments, location on screen, and ties to or integration with the underlying media content (e.g., pre-packaged, advertising, real-time, parties, premium access, permanent vs. chat, etc.). Peer ratings may be stored (e.g., comment and/or reviewer specific information) as part of the characterization information associated with one or more comments. Rating related information (e.g., explicit ratings, number of hits, number of click-throughs, followers, and stickiness) may also be stored as part of the characterization information associated with one or more comments.

Figure 6A:
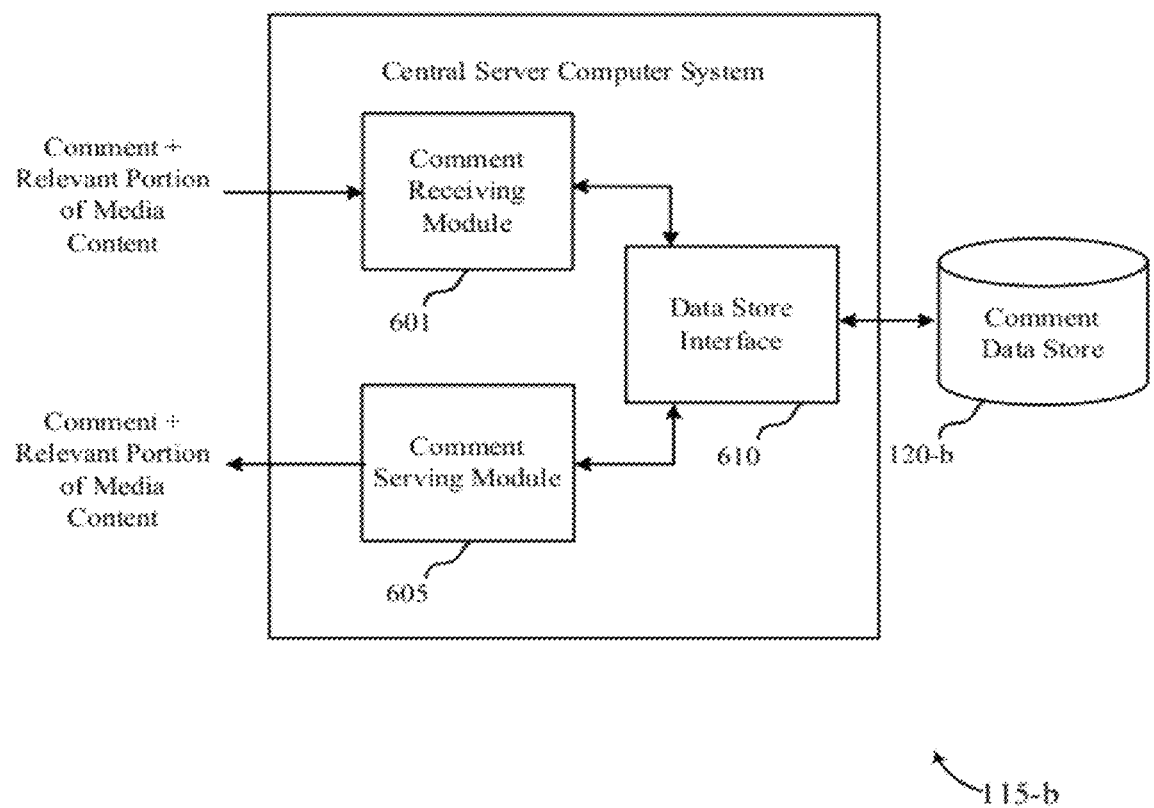
FIG. 6A is a block diagram of an example central server computer system according to various embodiments of the invention.

FIG. 6A illustrates a block diagram of an example central server computer system 115-*b*. The central server computer system 115-*b* of FIG. 6A may be an example of the central server computer system 115 of FIG. 1 or 5. The central server computer system 115-*b* of the present example includes a comment receiving module 601, a comment serving module 605, and a data store interface 610 configured to communicate with a comment data store 120-*b*. The comment data store 120-*b* may be an example of the data store 120 of FIG. 1 or 5.

The comment receiving module may receive (e.g., from input devices 105 of FIG. 1 or 5), a plurality of comments related to various articles of media content. The comment receiving module 601 may sort and categorize the received comments, and pass the comments to the data store interface 610 for storage in the comment data store 120-*b*. In certain examples, as described above, each received comment may indicate a relevant portion of media content (e.g., a time, screen location, and/or displayed object during the playback of a specified media content) to which that comment applies. Each comment may be associated with the relevant portion of media content to which the comment applies in the comment data store 120-*b*.

The comment serving module 605 may be configured to provide relevant stored comments from the comment data store to an output device (e.g., an output device 125 of FIG. 1) in conjunction with the playback of media content either by the output device or by another device accessible to a user of the output device. Each comment transmitted to the output device by the comment serving module 605 may include an indication of a portion of media content and/or characterization information that is associated with that comment. In certain examples, the comment serving module 605 may communicate with the output device to first identify the media content being played, then query the data store interface 610 for comments in the comment data store 120-*b* which are associated with that particular media content.

In some embodiments, the comments served to the output device by the comment serving module 605 may be selected based at least partially on a determined current point in the playback of the media content. For example, after determining the current point during the playback of the media content, the comment serving module 605 may transmit identified relevant comments to the output device which are associated with the current point in the playback of the media content. Additionally or alternatively, the comment serving module 605 may transmit identified relevant comments to the output device which are associated with later points in the playback of the media content, thereby allowing the output device to pre-cache relevant comments for later display.

As described above with regard to the previous Figures, each comment received by the central server computer system 115-*b* may be stored in the comment data store 120-*b* in association with characterization information based at least partially on the content of the comment and/or the author (i.e., the commentator) of the comment. In certain examples, the characterization information for a comment may include ratings and/or categories or tags for the content and/or author of the comment.

The characterization information for a stored comment may be received from an input device associated with the commentator that initially provided the comment and/or from another input device associated with a different commentator. In additional or alternative examples, at least some of the characterization information for a stored comment may be generated at the central server computer system, for instance, by applying a set of rules to data about the commentator who originally provided the comment, the content of the comment, and/or any other suitable criteria.

In certain examples, the comment serving module 605 may be configured to receive a filtering preference from an output device requesting or receiving comments associated with a particular item of media content. For example, the filtering preference from the output device may request only comments that are categorized as "humorous" or authored by a specified commentator. The central server computer system 115-b may filter the comments stored in the data store 120-b in association with the particular item of media content to transmit comments associated with the item of media content which fit the criteria of the filtering preference. Additionally or alternatively, the output device may filter the comments after the comments have been received at the output device.

Figure 6B:
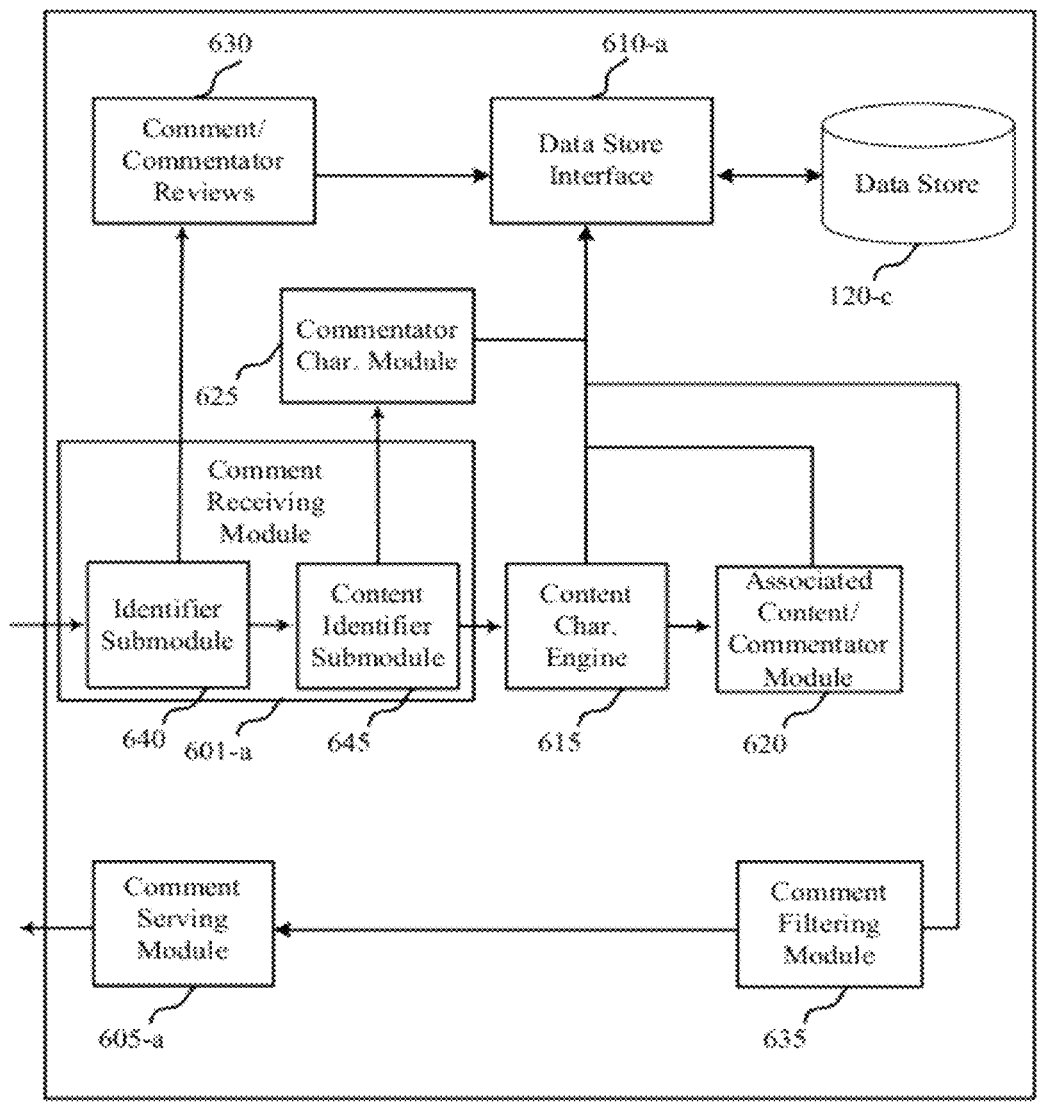
FIG. 6B is a block diagram of an example central server computer system according to various embodiments of the invention.

FIG. 6B illustrates an example diagram of certain components of another example central server computer system 115-c. The central server computer system 115-b of FIG. 6B may be an example of the central server computer system 115 of FIG. 1, 5, or 6A. Similar to the example of FIG. 6A, the central server computer system 115-c of the present example includes a comment receiving module 601-a, a comment serving module 605-a, and a data store interface 610-a configured to communicate with a comment data store 120-c. The comment data store 120-c may be an example of the data store 120 of FIG. 1, 5, or 6A. The central server computer system 115-c of the present example additionally includes a content characterization engine 615, an associated content/commentator module 620, a commentator characterization module 625, a comment/commentator review module 630, and a comment filtering module 635.

The comment receiving module 601-a may include an identifier submodule 640 and a content identifier submodule 645. Data may be received by the identifier submodule 605, and the identifier submodule 605 may identify whether the data is a comment, or a review or other assessment of a comment or commentator. If the received data is identified as a comment, the content identifier submodule 610 may identify the content being addressed. The commentator characterization module 625 may retrieve information on the commentator. The comment, timestamp, content identifier, commentator identifier, and information about the commentator may be stored in data store 120-c by the data store interface 610-a. The content characterization engine 615 may characterize the content (e.g., by looking at the text of the content, and a number of other factors outlined above), and cause the data store interface 610-a to store that information in the data store 120-c. The associated content/commentator module 620 may distribute information about the comment for storage with related content or commentators.

Returning to the identifier submodule 605, the identifier submodule 605 may identify the received data as a review of a comment/commentator. If so, the review is forwarded to the comment/commentator reviews module 630, for characterization and storage in the data store 120-c, linked as appropriate to a specific comment or commentator. The comment serving module 605-a may serve comments to one or more output devices based on one or more selected media content items. The filtering module 635 may filter comments from the data store 120-c based on characterization information associated with the comments and/or their associated authors in accordance with one or more filtering preferences received from one or more output devices. The depicted central server computer system 115-c illustrates but one example of the range of alternative options available.

Figure 6C:
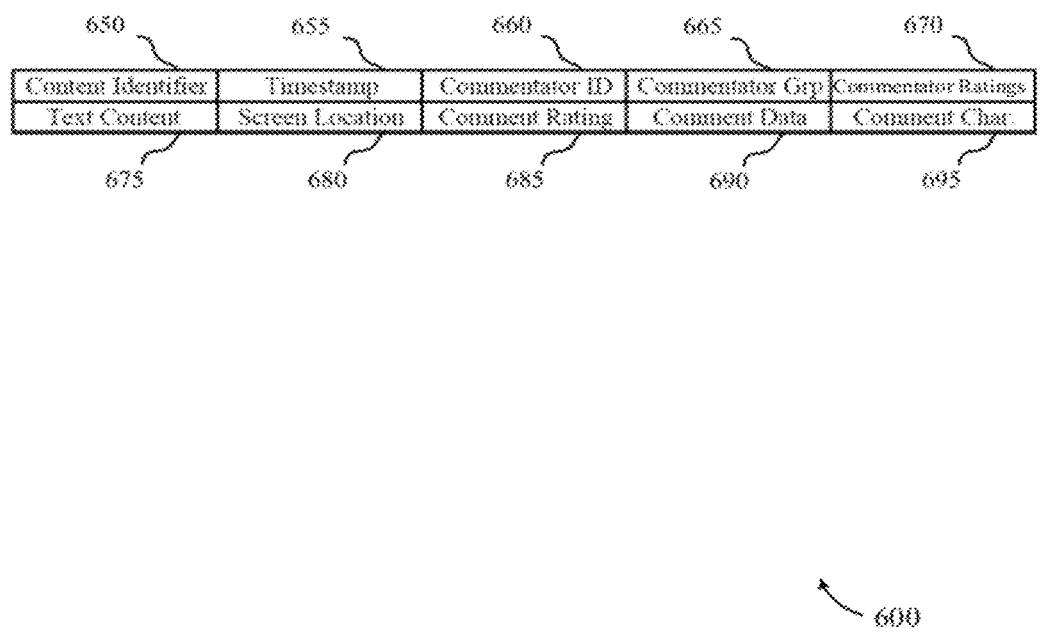
FIG. 6C is a block diagram of an example block of information that may be transmitted from an input device to a central server computer system according to various embodiments of the invention.

Referring to FIG. 6C, a block diagram 600 illustrates the type of information that may be transmitted from an input device 105 to a central server computer system 115, and stored in a data store 120 (e.g., in the system 100, 500 of FIG. 1 or 5). In the illustrated example, an input device may 105 may transmit a content identifier 650 (e.g., any number or alphanumeric character which identifies the content (e.g., movie or TV show) being commented upon); timestamp 655 (indicating the time or location in the content where the comment was placed); commentator ID 660 (e.g., any number or alphanumeric character which identifies the commentator); commentator group 665 (either a self-identified or otherwise identified group); peer ratings of the commentator 670 text (or other information) of the comment 675; screen location 680; peer ratings of the comment 685; other data associated with the comment 690 (e.g., commentator specified comment type or topic, such as 'acting,' 'directing,' 'cinematography,' and/or 'story'); and any comment characterization information 695 (e.g., system generated based on the text included). This type of information may be transmitted from an input device 105 to a central server computer system 115, and stored in a data store 120 (e.g., in the system 100, 200 of FIG. 1 or 5), or one or more aspects may be generated at a central server computer system 115 or other source.

Figure 7:
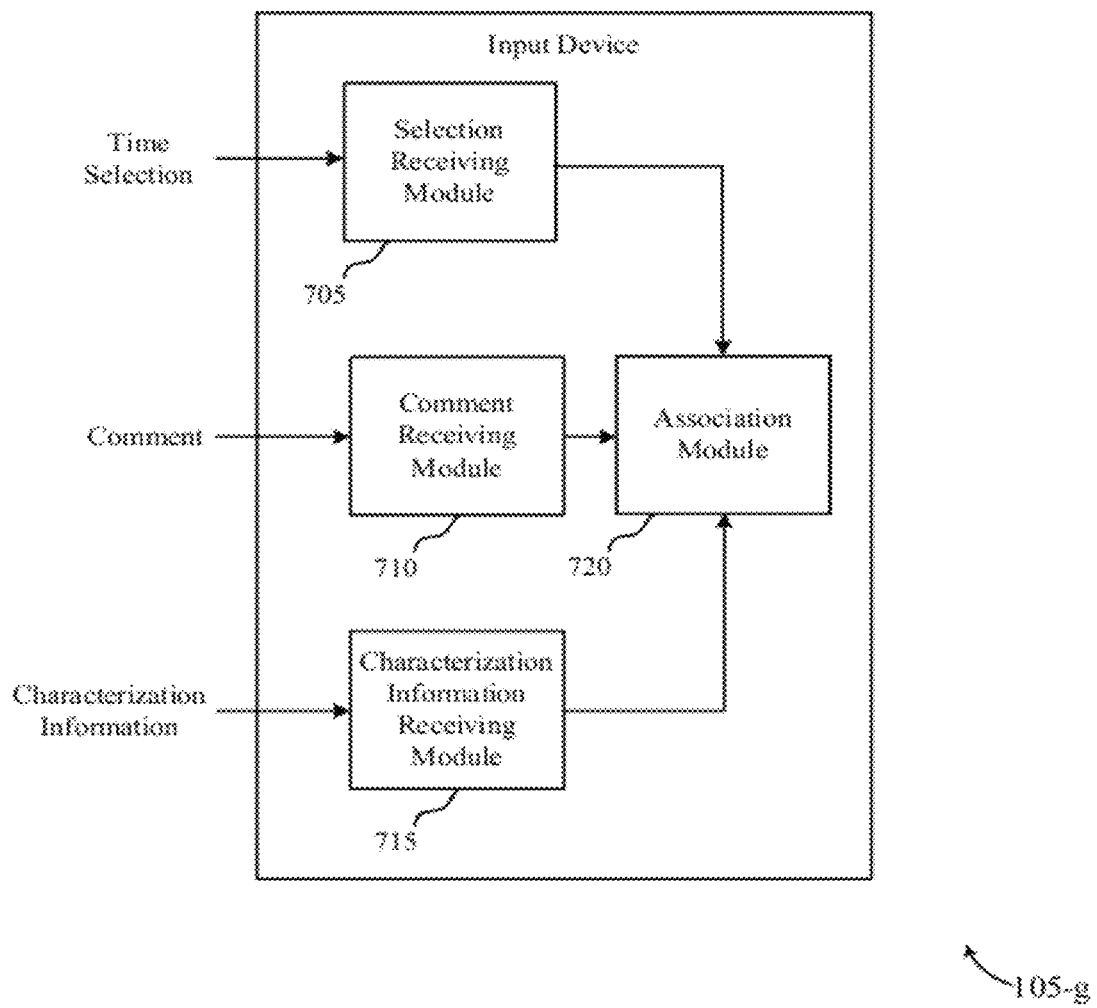
FIG. 7 is a block diagram of an example input device according to various embodiments of the invention.

FIG. 7 illustrates a block diagram of an example of an input device 105-g according to various aspects of the principles described herein. The input device 105-g may be an example of one or more of the input devices 105 described above with reference to FIG. 1 or 5. The input device 105-g of the present example includes a selection receiving module 705, a comment receiving module 710, a characterization information receiving module 715, and an association module 720. Each of these components may be in communication, directly or indirectly.

The selection receiving module 705 may be configured to receive a selection of a portion of a media content item being played. The selected portion may include a time during the playback of the media content, a screen location in the display of the media content, one or more image features in the playback of the media content, and/or any other selectable portion of the media content that may suit a particular application of these principles. The comment receiving module 710 may be configured to receive a comment authored or otherwise generated by a user of the input device, and the characterization information receiving module 715 may be configured to receive characterization information about or for the comment.

The characterization information receiving module 715 may receive the characterization information generated for the comment from the user at the input device. Additionally or alternatively, the characterization information receiving module 715 may receive at least some of the characterization information generated at the input device 105-g itself (e.g., based on an author of the comment and/or the content of the comment). In certain examples, the input device 105-g may include a rules engine for applying a set of characterization rules to a received comment to generate characterization information for the comment.

The association module 720 may be configured to associate the received comment with the selected portion of the media content and the characterization information. Once associated, the comment, the selected portion of the media content, and the characterization information may be transmitted to a central server computer system (e.g., the central server computer system 115 of FIG. 1, 5, 6A, or 6B) for storage at a data store 120.

In certain examples, the characterization information receiving module 715 may be further configured to receive characterization information from a user of the input device for a comment that was not authored by the user of the input device. The characterization information receiving module 715 may identify the comment to which the characterization information applies, and the association module 720 may associate the newly received characterization information with the existing comment and transmit the characterization information and its association with the existing comment to the central server computer system for storage in the data store.

Figure 8:
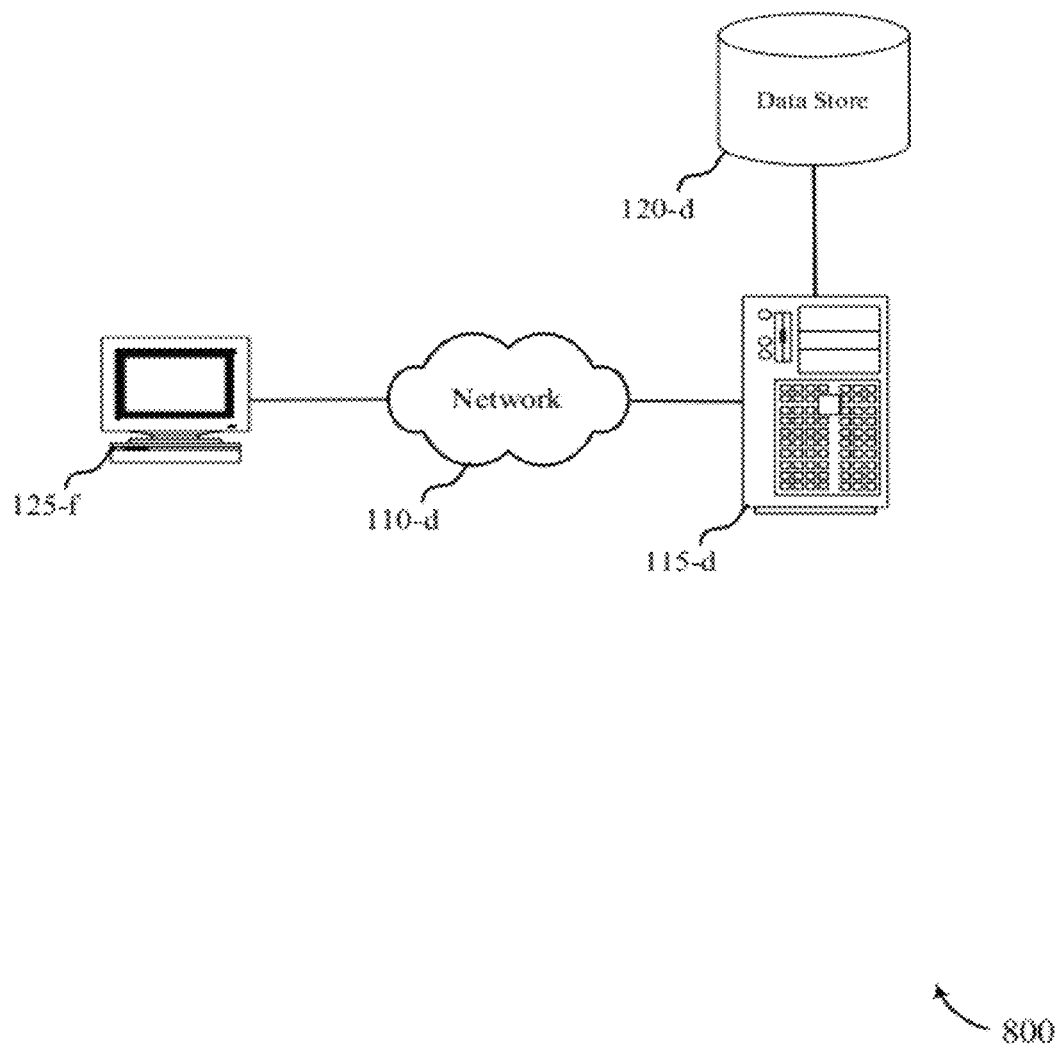
FIG. 8 is a block diagram of an example system according to various embodiments of the invention.

In one set of embodiments, shown in FIG. 8, a system 800 includes output device 125-$f$ (e.g., a computer or television), network 110-$d$, central server computer system 115-$d$, and data store 120-$d$. Although in this case a central server computer system 115-$d$ delivers the content and a comment stream, the underlying content and associated comments may (separately or in combination) be accessed from a local source (e.g., DVD or other locally stored multimedia). This system 800 may an example of the system 100, 500, of FIG. 1 or 5. Each of these components may be in communication with each other, directly or indirectly.

The central server computer system 115-$d$ may stream, or otherwise transmit, video data (or other information data) to the output device 125-$f$, along with the time specific comments. The central server computer system 115-$d$ may receive user preferences and selections for comment retrieval and data associated therewith, and access the selected information from the data store 120-$d$. The content (and comments) may be accessed from data store 120-$d$, or other sources.

Time, screen, and object location-specific comments may be associated with the content. A user interface control of an output device 125-$f$ allows a user to select the types of comments or commentators they want to see. As noted above, comments may be stored separately from the underlying content. However, by using user selection preferences and time codes, time and location specific comments may be delivered according to user preferences. The accessed comments may include text, video, audio, applications, links, or other content.

In one example, the content stream and user interface control are independent and distinct from each other (even when both are on the same display). In other embodiments, the content stream and user interface control are overlaid or partially integrated. In still other embodiments, the content stream and user interface control are tightly integrated. There are, therefore, a number of different options for various user interfaces that may be used to view the comment stream. In one example, there may be a comment pane that appears during a movie, integrated therein. In another example, there may be separate windows for the content and comment panes, or in still other examples they may appear on separate devices.

A user interface may include additional configurations or advanced functionality. A comment pane may show only redacted comments, and a user may select comments to see the full text, or thread. Search tools may allow the user to find a term that appears in a comment, and separate search functions may allow a user to search for commentators based on name, ratings, and interests. There may be premium content, and advertisements. There may be user playback control for content.

The output device 125-$f$ may include a variety of tools to filter comments. As noted, a more basic design may allow a user to select favorite commentators and friends, or highly rated comments or commentators. Each selected commentator's time specific comments (generated at different times) may be pulled into the comment stream, and displayed. In other examples, the comments and commentators may be selected automatically based on historic preferences. There may be comment count monitors and alerts, and different users may adjust their noise tolerance.

In some examples, the comment viewing pane may adjust automatically, as well as at user's discretion. In one example, there is an unobtrusive tab system to allow switching among various configurations. Users may have varying levels of review and ratings for commentators and comments. Users may flag comments and commentators who do not comply with standards.

There are a number of techniques that may be used for timely comment delivery. In some examples, an output device 125-$g$ transmits a time stamp and content identifier to the central server computer system 115-$c$. The central server computer system 115-$c$ may then identify the comments according to the preferences of the user, and transmit the comments to the output device 125-$g$ in advance of or coordinated with the time location in the content being played.

There may be a number of features applicable to pre-caching comments so that they are ready for viewing at time-applicable moments in the content. User history may be analyzed in depth (e.g., by central server computer system 115-$c$, or locally). Comments may be pre-cached based on known or predictable routes through meta-media, or based on user tendency to explore commentary more deeply. In one example, if it is unusual for a user to delve deeply into comments, only text (or a portion thereof) may be downloaded and pre-cached, thereby saving bandwidth. If a user is likely to pause and delve deeply into comments, additional comments may be downloaded. If a user is more likely to explore certain forms of comments (e.g., text only, music, images, video, certain commentators), those forms of content may be pre-cached, instead of others. Users may also specify user preferences for pre-caching, providing preferences that specify certain forms of content, commentators, highly rated content, types of comments, etc.

Comments may be pre-cached based on location of playhead to allow scrubbing backward and forward. A cache of relevant clip commentary may be retained until the clip has finished. Comments may be pre-cached based on user tendency to follow links or references in commentary, and based on user tendency to explore atypical commentary types. Various audio, video and other high bandwidth comments may be pre-cached earlier than text. As a user scrubs to locate comments, media may be pre-cached so a relevant clip can play. Pre-caching may begin before the underlying content is being played (e.g., during selection of parameters for a session, or when a user changes filter settings). Comments may be pre-cached to allow quick access to the full version of redacted comments. The pre-caching discussed herein may be controlled by the output device 125, or a central server computer system (e.g., central server computer system 115 of FIG. 1, 5, 6A, or 6B). In certain examples, portions of media and/or commentary may be pre-cached to be blended with streamed portions of the media and/or commentary when available. For instance, pre-cached portions may include the first moments of a scene, heavily commented sections of media, authentication tokens and/or other aspects of media and commentary that may be essential to uninterrupted media and comment flow.

Figure 9:
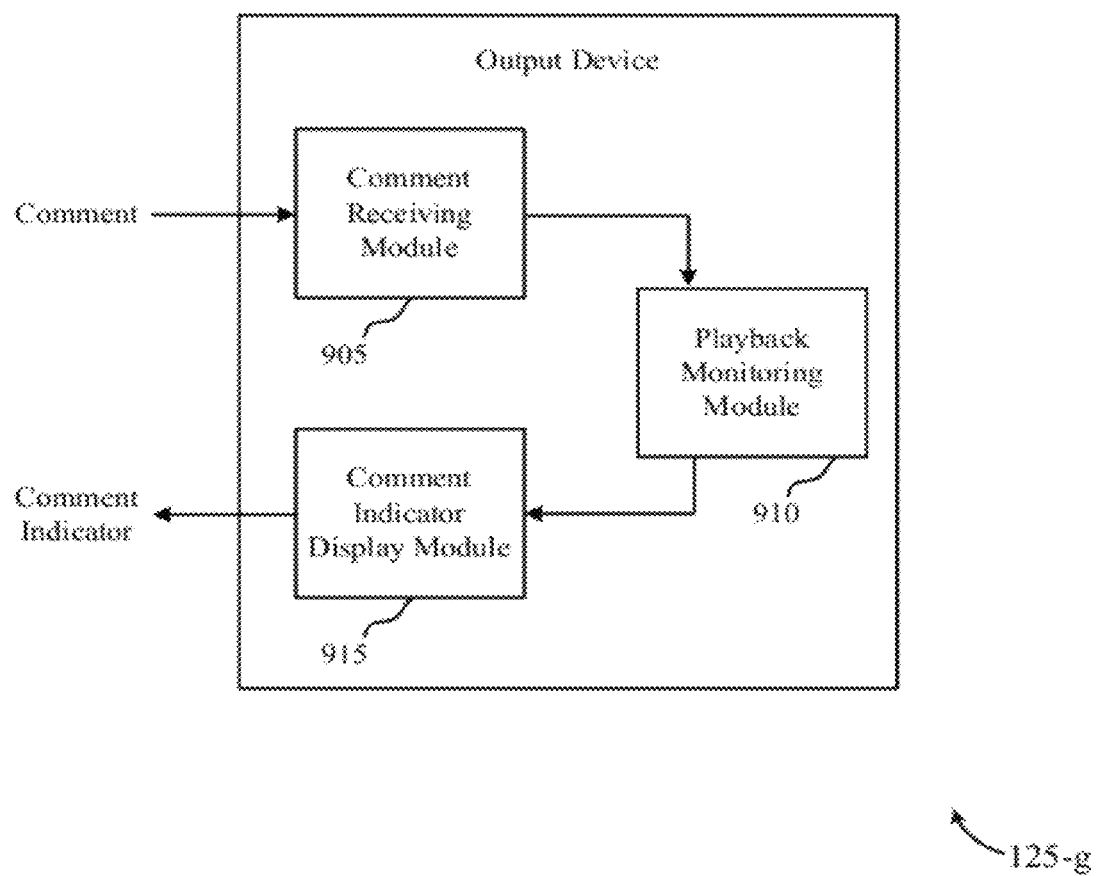
FIG. 9 is a block diagram of an example output device according to various embodiments of the invention.

FIG. 9 illustrates a block diagram of an example output device 125-g. The output device 125-g may be an example of the output device 125 described above with respect to FIG. 1 or 8. In certain examples, the same device may function as both an input device 105 and an output device 125. The output device 125-g of the present example includes a comment receiving module 905, a playback monitoring module 910, and a comment indicator display module 915. Each of these components may be in communication, directly or indirectly.

The comment receiving module 905 may receive comments related to media content being played at the output device 125-g or at a separate device accessible to a user of the output device 125-g. The comments may be received at the comment receiving module 905 over a network from a central server computer system (e.g., the central server computer system 115 of FIG. 1, 5, 6A, 6B, or 8.) Each of the received comments may be associated with a specific portion (e.g., a specific point in time during the playback of the media content, a screen location, an object displayed during the playback of the media content, etc.) of the media content being played. Additionally, each of the received comments may be associated with characterization information based at least on the content of the comment and/or an author of the comment. As described above, the characterization information may include categories, ratings, and/or other types of characterization information.

The playback monitoring module 910 may monitor the playback of the media content either at the output device 125-g itself or on a separate device accessible to the user of the output device 125-g. The playback monitoring module 910 may identify a current point during the playback of the media content and determine whether any of the received comments is relevant to or otherwise associated with the current point. For each comment that is relevant to or associated with the current point during the playback of the media content, the playback monitoring module 910 may cause the comment indicator display module 915 to display an indicator of that comment to the user of the output device 125-g. If a user of the output device 125-g selects a displayed indicator, the output device 125-g may display the comment associated with that indicator to the user.

In certain examples, the output device 125-g may filter the comments received at the comment receiving module 905 based on at least one comment filtering preference received from the user of the output device. The at least one comment filtering preference may be based on the characterization information associated with the received comments. The filtering preference may be enforced, for instance, by applying a set of filtering rules to the received comments with a rules engine to produce a subset of received comments. For example, the comment filtering preference may include a selected category of comments or comment authors which the user expressly desires to include in or omit from the comment indicators displayed by the comment indicator display module 915. As a result of the filtering operation, the comment indicator display module 915 may display indicators only for comments in the filtered subset of the received comments that are associated with the current point in the playback of the media content.

Additionally or alternatively, the output device 125-g may be configured to receive a filtering preference from the user and transmit the filtering preference to the central server computer system. Once the filtering preference is received by the central server computer system, the central server computer system may filter comments transmitted to the output device 125-g based on the filtering preference such that each comment received at the comment receiving module 905 satisfies or conforms to the at least one filtering preference.

In additional or alternative examples, the output device 125-g may be further configured to receive new characterization information from a user of the output device for one or more of the comments received from a central server computer system. For example, a user of the output device 125-g may view an indication of a comment that is associated with a current point in the playback of the media content, click on or otherwise select the comment indicator to view the comment, and generate a rating or tag for that comment. Additionally or alternatively, the output device 125-g itself may generate new characterization information for one of the received comments by applying a set of characterization rules or performing some other type of logical deduction. The new characterization information received from the user or generated at the output device 125-g may be transmitted from the output device 125-g to the central server computer system.

Figure 10:
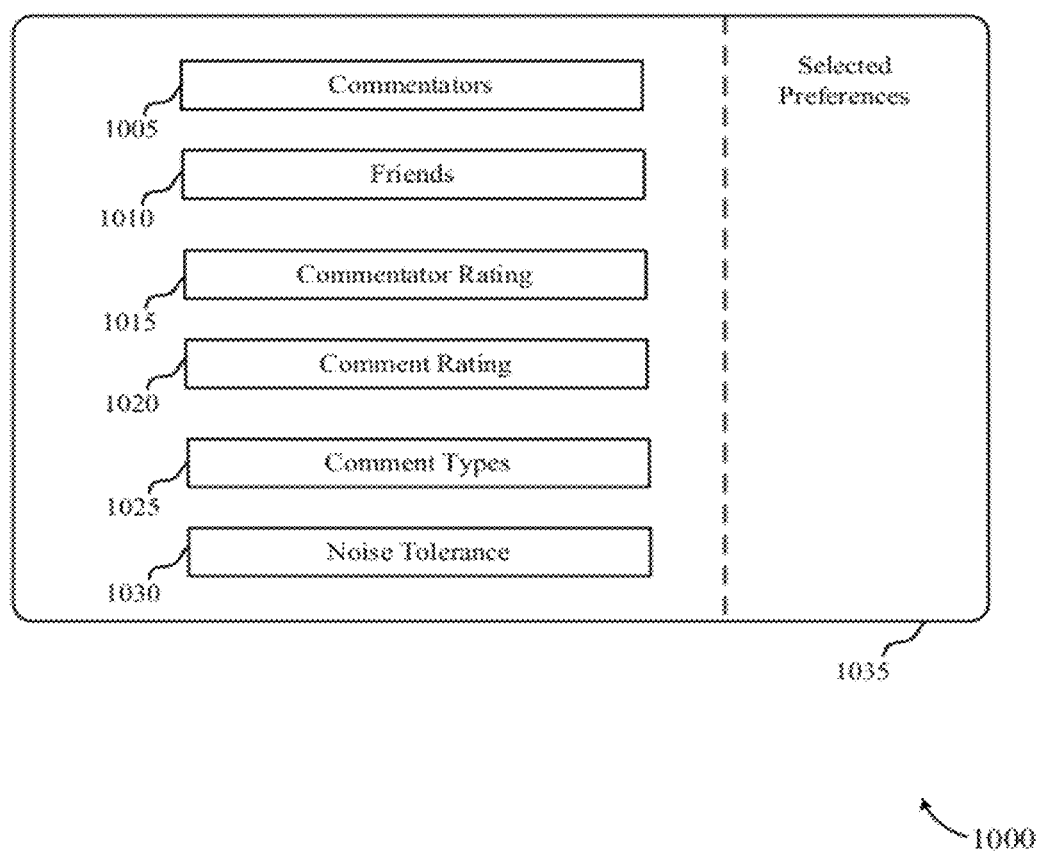
FIG. 10 is a block diagram of an example display according to various embodiments of the invention.

FIG. 10 illustrates a block diagram 1000 of an example display. The display may be on, or integrated with, a mobile device, mobile phone, laptop, tablet, computer, television, or any number of other computing or viewing devices (e.g., output device 125 of FIG. 1, 8, or 9). The display may be a touch screen or be controlled by user inputs into a remote, peripheral, or other mobile device. In the illustrated display, there are a number of user-selectable buttons that may be used to filter comments. The filtering may take place at an output device 125, a central server computer system 115 (e.g., the central server computer system 115 of FIG. 1, 5, 6A, 6B, or 8), or elsewhere.

In one example, each user-selectable button may be clicked to display a drop down menu that includes a listing and, in some instances, a search bar. The user-selectable buttons may include a commentator 1005 selection button, a friends 1010 selection button, a commentator rating 1015 selection button (which may include a minimum commentator rating cutoff), a comment rating 1020 selection button (which may include a minimum comment rating cutoff), a comment types 1025 selection button (which may limit comments to certain types), and a noise tolerance 1030 selection button (which may limit comments shown if they increase past a threshold). The selected preferences 1035 portion of the window illustrates the filter selections of the user. The illustrated example shows merely one example, and is not intended to limit the scope of the invention.

To help the user avoid having an overwhelming number of comments to view in a session, a user interface or display may include a comment counter (not shown). This may be a component of a pane or a standalone pane designed to help a user apply and change filtering for a viewing session. This pane may be available at the beginning of a viewing session and may be revisited during a session for making adjustments. As the user selects commentators for the media, each of which will have an associated comment tally, the comment counter may show the total number of comments that will be encountered during the session. The user may choose to reduce or increase the number of commentators or may choose to change filtering so that the number comments in a particular a topic area, for example, are increased or decreased. The user may similarly choose to include only comments of a higher ranking. The comment counter may also be manipulated by the user to make adjustment to the commentary queue, by resetting the number manually and allowing the system to more strictly limit the commentary based on stricter limits across the board or in certain categories by user specification, such as ranking.

In additional or alternative examples, a flexible unit-based structure may be applied to media timelines to flexibly manage the delivery and display of commentary. For comment displays to be readable and otherwise manageable in size, commentary may be segmented into units that allow a set of comments to be displayed or deployed at one time, or on one web page, or in one commentary channel or screen location, or as a delivery package for other uses. In its simplest form this allows a user to view a set of comments that is not overwhelmingly large, even when commentary traffic is heavy, and to have a suitable period of time to scan or view the commentary.

These units may be associated most closely with discrete units of a media timeline but also may be associated with and include commentary and media outside the boundaries of the timeline unit, especially when aspects of the commentary and media within the boundaries of the timeline unit share associations with material beyond those boundaries. Similarly, social linkages beyond the timeline unit also may effectively expand or reduce the field of potential comments to be delivered into a unit and so may change the delineation of these units.

In some cases, the inclusion of comments from beyond the strict timeline unit may be a greater or lesser factor in delineating units, and a user may have the ability to control their inclusion by adjusting commentary tolerances and filters, adjusting display characteristics so that, for example, such comments are not displayed in their entirety but are in shortened form or a form that is accessible to a user but not fully displayed. Controls may allow a user to select the degree to which the system delivers commentary outside the time unit, and unit size and location also may be controlled directly by users. When commentary is delivered to a user via separate or segregated channels or other delivery vehicles, these channels may apply differing standards and time-units even as they deliver commentary simultaneously.

This unit-based structure may be apportioned differently for different viewers of the same media, or it may be continually reapportioned as a user moves through media and commentary, reflecting user decisions or shifting interests during a session. It may be reapportioned as users with differing interests and social networks join a session that includes multiple users. It may be apportioned to help attract or focus commentary in particular subject areas or to conduct testing of user interests, sensibilities and tolerances. It may be used to facilitate data analysis to improve media, meta-media, comment delivery systems and advertising strategies.

Timeline units also may be associated with other timeline units in current and other media. Timeline units and associations may be mapped, viewed in various forms, and analyzed to improve comment delivery and to assist in the construction of flexible units of media and meta-media that may be further appreciated, joined and augmented with commentary. Various associations, comments, commentary units, media and media units may be accessed from a single media timeline unit via the particular combination of associations relevant to that unit. The simplest embodiment of this may be an ability to view and map various associations from a specific comment and show the strength and degree of separation of each association so that a user may, for example, determine optimal routes through the commentary and media to link one actor with another. This capability may also be used to map media and commentary entry points into popular or otherwise significant associative hubs and daisy-chains.

In certain examples, a media header (not shown) may be a commentary space that refers to the entire movie, TV episode, song or other media item. It may contain multiple aspects, including an area for users to insert general commentary, or introductions of their timeline commentary, or to collect notes and other material that may or may not be available to other users. The media header may also include an area for content owners or distributors to insert official general commentary and information, and an area in which users and content owners and others may work together to fill in general information about the media, perhaps through a wiki or other process. The media header may also contain a facility for making some of this information available to other services and entities or for users outside the comment software environment. For example, some of the information collected may be available to anyone wishing to correct or complete the metadata contained in their music files.

In certain examples, a user may be able to highlight portions of a displayed comment composed by another user. Highlighting of comment text or other similar actions on comments may allow a user to add that comment and the highlighting to a store of comments by others that may appear as part of a user's library of comments or as part of a user's stream of comments available to other users. Highlighted text may be visible in its original form and in the context of the original comment or it may be lifted from the context of the original comment and displayed separately. The highlighted text may be displayed in combination with highlighting by other users so that a user may see an overlay on the text showing areas highlighted by multiple users with increased color intensity, for example. A highlight overlay also may show highlighting cross-referenced to a user's interests, sensibilities and social network, so that the overlay may color code certain highlighting, create visual effects that call attention to certain highlighting, or deliver a simple omnibus overlay tailored to a user. The highlight overlay may further filter out some highlighting altogether. An overlay also may be mapped to show highlight sources and other associations so that a user may, for example, be able to roll over highlighted text and see the users who are the sources of the highlighting and be able to view individual highlights as well as any related commentary added by those users.

Figure 11A:
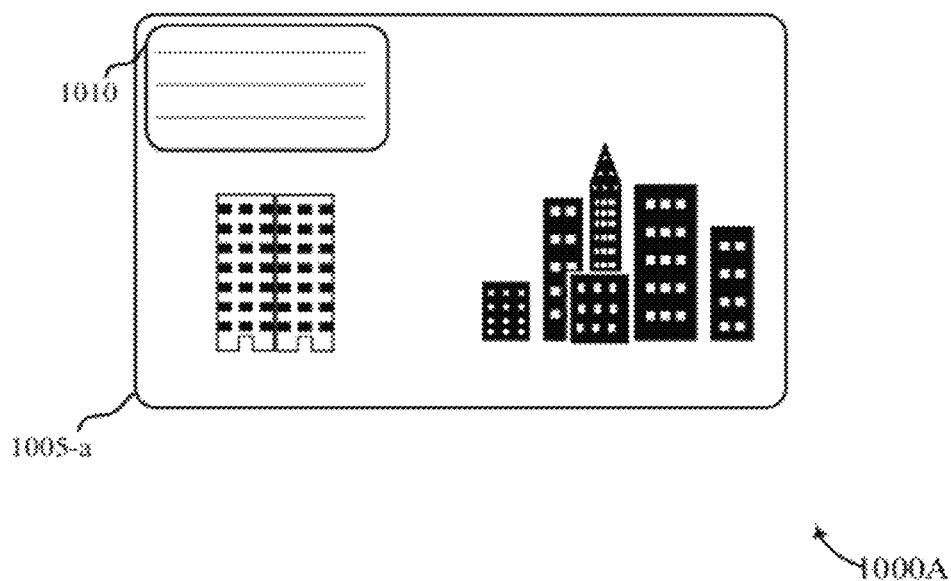
FIG. 11A is a block diagram of an example display according to various embodiments of the invention.
Figure 11B:
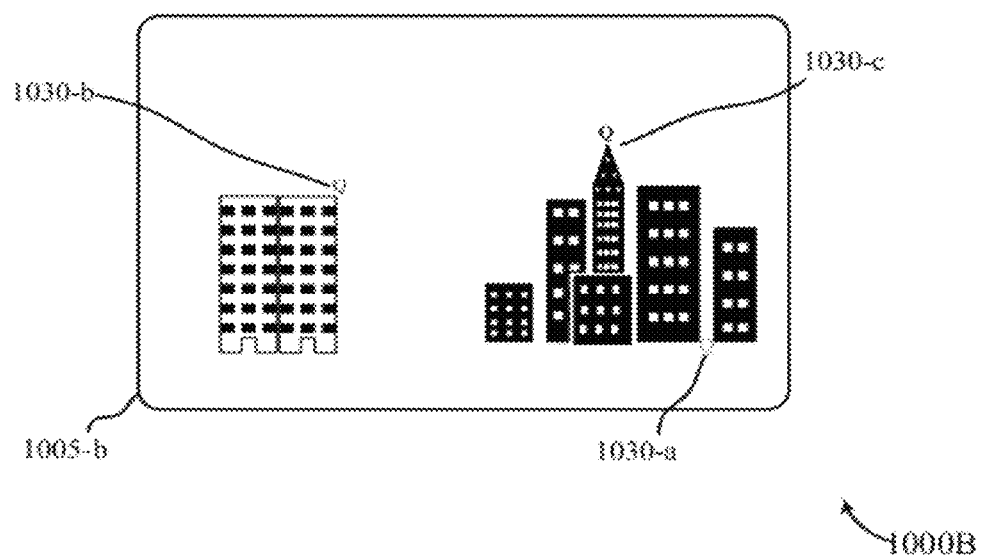
Figure 12:
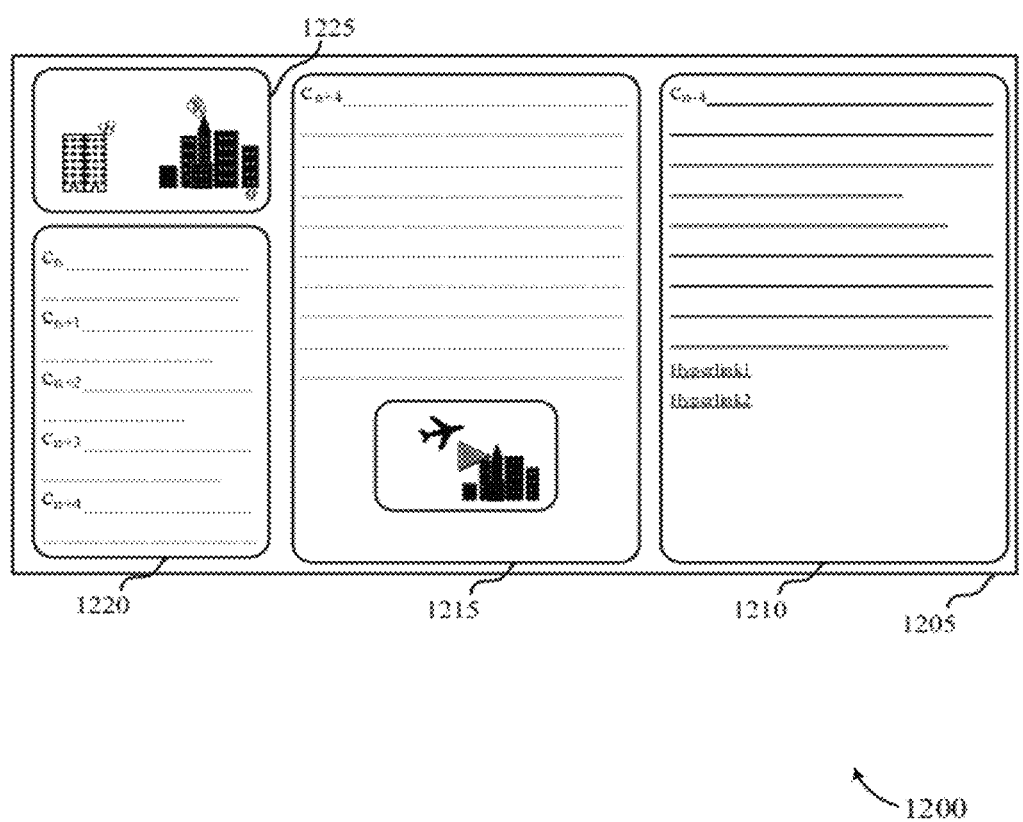
FIG. 12 is a block diagram of an example display according to various embodiments of the invention.

FIGS. 11A, 11B, and 12 illustrate a number of examples of different display interfaces that may be used for viewing time-specific comments. The presence of time- and location-specific comments may be displayed as window panes, or as icons or with other indicators on a display and/or secondary device. For playback, a variety of techniques may be used to indicate that comments placed at a certain time are associated with a specific location. An icon may be shown for each comment, or an icon can be shown with different transparencies to illustrate the number of comments. Objects may be controlled to glow, shimmer, or have different color features when comments become active. Users may control this so they can set the noise level for given content. There are a number of other viewing interfaces available; for example, FIG. 4 illustrates an interface 405-*b* that may be used for comment insertion and viewing.

FIG. 11A illustrates an example block diagram 1100A of a display 1105-*a*. The display 1105-*a* may be on, or integrated with, a mobile device, mobile phone, laptop, tablet, computer, television, or any number of other computing or viewing devices. The display 1105-*a* may be a touch screen or be controlled by user inputs into a remote, peripheral, or other mobile device. In the illustrated display 1105-a, the window pane for comments 1110 shows a comments stream as it goes by, reflecting the filter choices made by a viewer (e.g., as shown in FIG. 10). The size and placing of the window pane 1110 may be automated, or may be controlled by a user.

In other examples, a comment pane or display may be organized so that comments of a particular type, such as 'humorous', or in a particular category, such as 'acting' may be mapped to appear in particular areas of the screen or along particular axes or at particular apparent distances from the screen in 3D environments. Color coding may also be used to distinguish among comments. Ranking or recommendation status also may be mapped or allocated a type of visual distinction.

FIG. 11B illustrates an example block diagram 1100B of a display 1105-b. The display 1105-b may be on, or integrated with, a mobile device, mobile phone, laptop, tablet, computer, television, or any number of other computing or viewing devices. The display 1105-b may be a touch screen or be controlled by user inputs into a remote, peripheral, or other mobile device. In the illustrated display 1105-b, the indicators 1130 of location-specific comments are again overlaid on the content, and marked with the letter Q. Only filtered comments are reflected by the indicators (i.e., indicators don't show all comments, just the types a user has selected). The transparency of each Q illustrates the amount of comments associated with the respective Q (i.e., 1130-a, 1130-b, or 1130-c) at a given time in the content playback.

A viewer may click on a Q or select an area of Qs to view or get more information on the comments. As noted, comments are not limited to text, but may include text, audio, video, links, applications, discussion threads, other content, or any combination thereof. Comments of different types may have different letters, or different colors, shapes, effects, or fonts. Comments within a 3D environment may be overlaid on the image in ways that make use of 3D to display them joined with the media so that objects in the media and comment markers are able to, for example, occlude each other from view. Comment markers also may be made to appear closer or more distant to show their relevance to the user's interests, for example, or to show their relationship to areas of the 3D viewing field. Further embodiments may allow the system or its users to take even further advantage of the 3D environment by creating, for example, storage areas, hidden icons or objects, embedded images or video that join with the underlying media and which also may allow users the ability, for example, to augment media in such a way as to, for example, depart from the original media's time sequencing, creating gaming opportunities that further allow the user to join and augment the underlying media. Such techniques may also be employed within a 3D environment to display comments, comment clusters, or comment markers separately from the media. Such techniques may also be used within a 2D environment where possible.

FIG. 12 illustrates an example block diagram 1200 of a display 1205. The display 1205 may be on, or integrated with, a mobile device, mobile phone, laptop, tablet, computer, television, or any number of other computing or viewing devices. The display 1205 may be a touch screen or be controlled by user inputs into a remote, peripheral, or other mobile device. In the illustrated display 1205, a favorites window 1210 (e.g., favorite or primary commentators, friends, etc), a selected comment window 1215 (with full text and video viewing), a comment stream from other commentators 1220, and content display 1225 are in different windows within the display 1205. However, in other embodiments, each interface may be overlaid or integrated or on a screen, or some subset of this functionality may be on a different device. In the illustrated display 1225, the indicators of location-specific comments are again overlaid on the content, and each comment is marked with the letter Q. The number of Qs illustrates the amount of comments.

A viewer may click on a Q or select an area of Qs to view (e.g., in window 1215, 1220) or get more information on the comment or set of comments. As noted, comments are not limited to text, but may include text, audio, video, links, other content, or any combination thereof. Comments of different types may have different letters, or different colors, shapes, or fonts.

More generally, it is worth noting that in some embodiments, synchronized viewing may be managed among small groups of friends through coordinated buffering and managed pausing in which one person's pause is relayed to all. Resuming play may be handled in several ways. A leader may be designated to have primary control of the play function. Or it may be up to a vote. When enough people press the play or 'move on' button, the group moves on. Users are connected by text, voice, video, or any media form appropriate to the underlying media content. Written comments may be organized on tracks, one for each participant.

Interfaces may include search functions, which may give a user wide leeway to access any Internet resource. Alternatively, there may be stricter limitations, such as an ability to restrict search to comments only, comments about a specific director or actor, comments within the media being viewed, comments that were added to the viewing session, comments that were not added, clip comments only, and comments that are within a certain area of the timeline. The search results display may allow the user to choose to be taken to the relevant clip even if it is not part of the current media.

As noted above, comment clips are comments that cite both an in and out point in media, so that in a movie, for example, an entire clip is capture by the commentary. Users may want to have comment clips easily distinguished from comments with only an insertion point, so several methods will allow users to distinguish these at a glance and perhaps call them up for separate viewing.

In one view, for example, clip comments may appear in a 'current comment' box with a demarcation such as a line alongside or under the comment. In a stack of comments, a similar line may extend up or down beyond the individual comment to show that this comment refers to a clip that still underlies the current nonclip commentary. In this view, several lines may extend through many comments to show that a particular scene has many clip comments attributed to it. It may be possible to click a line and be brought to a clip comment whose insertion point is further back in the timeline. If it is not practical to display all of the lines required, these lines may be consolidated into a single bold line, for example, and it may be possible for the user to click on the line and be brought to a pane in which all current clip comments are displayed.

Another view may provide a small pane within the interface that shows the number or approximate number of underlying comment clips and may also be clicked to display the comments themselves. This pane may be as simple as a series of stacked horizontal lines.

Aspects may be implemented that create a unique environment in which a universal player handles media from multiple sources and distribution environments, and is combined with commentary features that reach across all media types. Further, comment document features may allow users to cross the divide between media types and titles and create new forms of meta-media. An ability to manage micropayments for media and for the meta-media it facilitates allows content owners to be compensated and, additionally, to create custom payment regimes that can be communicated to the user and transacted. For example, payment requirements may be inserted into media as special comments, allocated with precision to handle price differences even among different scenes in a movie or among clips in a song, cross-referenced to the media's distribution source, and tallied for the user to accept or decline or opt for a higher level of access within a distribution environment. The system may allow highly targeted and easily avoided marketing and advertisement to be embedded in media with unprecedented interactivity features. These innovations create many new opportunities to deliver content and meta-content to users in ways that have never been available. It offers significant benefits over any media distribution regime currently extant, and yet it is capable of working with all of them non-disruptively.

There may be a method to track a user's viewing of small media clips and to assess micropayments from users to content owners or distributors by delivering information about what portions of a piece of media have been viewed or accessed and the duration of that viewing session. In one example, a specialized comment may be inserted into the 'header' area at the start of a movie or song to describe a cost per time unit for clips of that media. Similar comments may be inserted elsewhere in the media if costs per time unit vary within that media. These internal comments may be inserted in pairs so that they describe in/out points. That information can then be drawn from the comment by the local application to provide the user with cost estimates in advance. The user can set cost thresholds that raise flags but otherwise allow this information to be gathered and tallied behind the scenes.

Thus, there may be a method for delivering to a central server computer system (and in turn to content owners and distributors) information about what clips have been viewed. There may be an automated system of query and response that allows a user to acknowledge and agree to micropayment charges before viewing a clip or to agree to charges on a less granular basis.

Clips may be linked in a 'splice' daisy chain, hub-and-spoke, or other configuration. A splice may contain any form of traditional commentary or none at all. It can link in a simple chain, or it may offer multiple splice options (decision points to give users a chance set a new course). It also may splice one clip to several clips that all run (more or less) simultaneously. This may create a condition to allow them to be mashed up using separate tracks overlaid on one another. To a user, the interface may look like a standard multi-track editing tool, but behind the scenes all the editing parameters may be contained in these splices (audio levels, clip start and stop times relative to the other clips, video effects and placement, pans, zooms . . . ). Thus, a splice may be a simple link between two media clips. It may contain a comment, or not, and it may be encoded with identifiers for each of the clips it connects. A splice may be a link with multiple options going forward, a decision point, so users can choose among various paths. Or a splice may be a link with multiple clips going forward, which may be presented to a viewer simultaneously, and that may be daisy chained with other splice forms.

Figure 13:
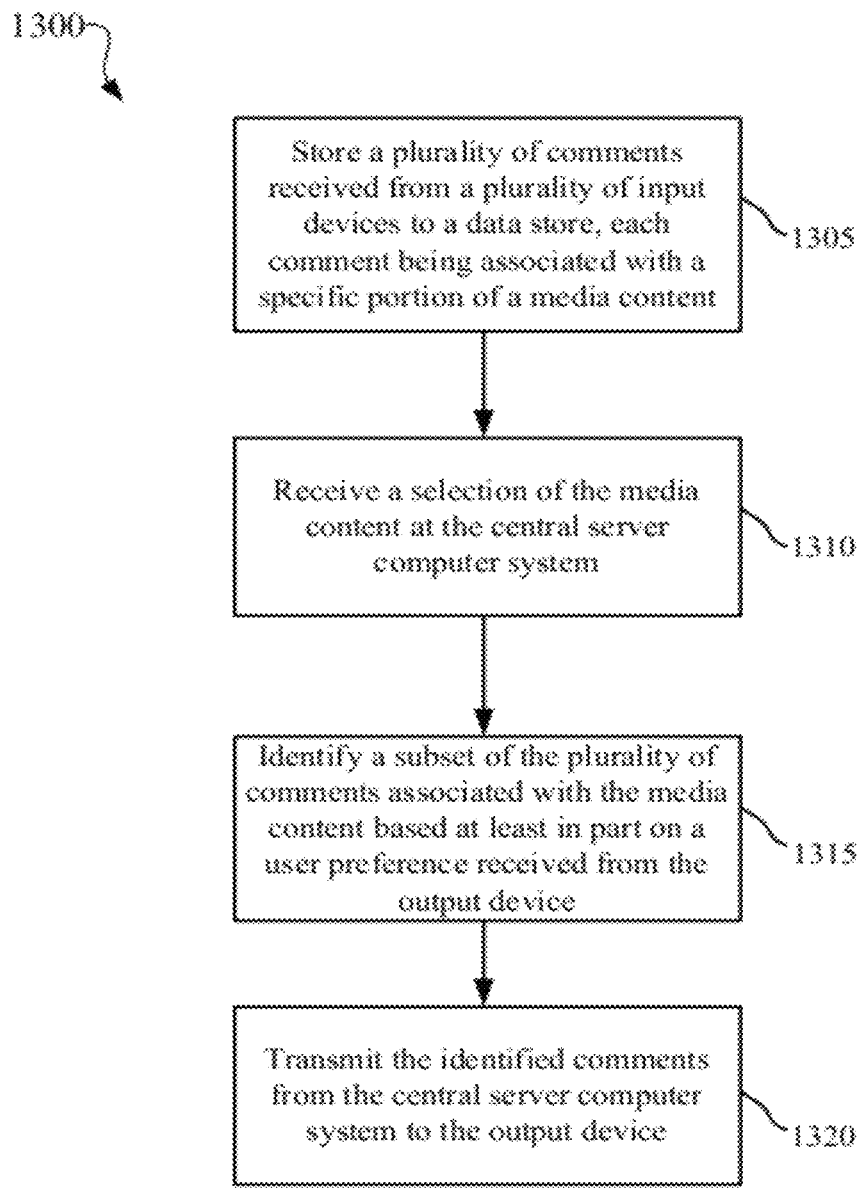
FIG. 13 is a flowchart diagram of an example method of associating comments with playback of media content according to various embodiments of the invention.

Referring now to FIG. 13, a flowchart diagram is shown of an example method 1300 of associating comments with playback of media content. The method 1300 may be performed, for example, by the central server computer system 115 of FIG. 1, 5, 6A, 6B, or 8. At block 1305, a plurality of comments received from a plurality of input devices is stored to a data store. Each comment may be associated with a specific portion of a media content. At block 1310, a selection of the media content is received at the central server computer system, for example, from an output device. At block 1315, a subset of the plurality of comments associated with the media content is identified based at least in part on a user preference received from the output device. At block 1320, the identified comments are transmitted from the central server computer system to the output device.

Figure 14:
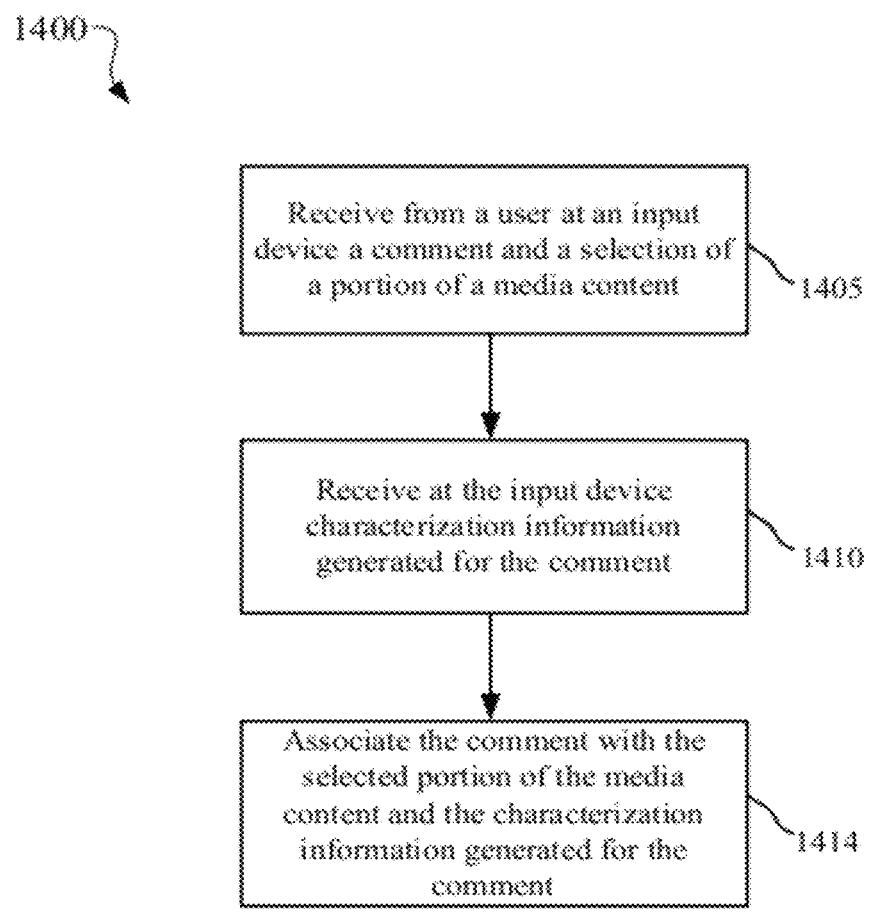
FIG. 14 is a flowchart diagram of an example method of associating comments with playback of media content according to various embodiments of the invention.

Referring now to FIG. 14, a flowchart diagram is shown of an example method 1400 of associating comments with playback of media content. The method 1400 may be performed, for example, by the input device 105 of FIG. 1, 5, or 7. At block 1405, a comment and a selection of a portion of a media comment are received from a user at an input device. At block 1410, characterization information generated for the comment is received at the input device. At block 1415, the comment is associated with the selected portion of the media content and the characterization information generated for the comment.

Figure 15:
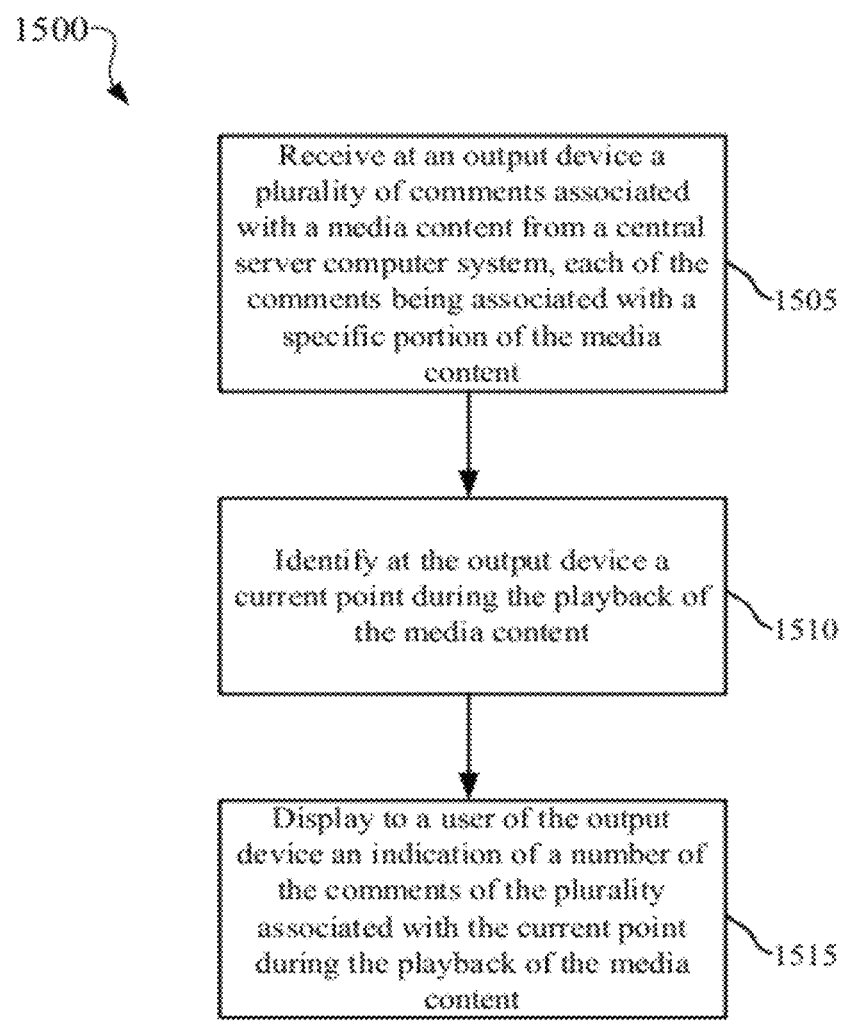
FIG. 15 is a flowchart diagram of an example method of associating comments with playback of media content according to various embodiments of the invention.

Referring now to FIG. 15, a flowchart diagram is shown of an example method 1500 of associating comments with playback of media content. The method 1500 may be performed, for example, by the output device 125 of FIG. 1, 8, or 9. At block 1505, a plurality of comments associated with a media content is received from a central server computer system, each of the comments being associated with a specific portion of the media content. At block 1510, a current point during the playback of the media content is identified at the output device. At block 1515, an indication of a number of the comments associated with the current point during the playback of the media content is displayed to a user of the output device.

Figure 16:
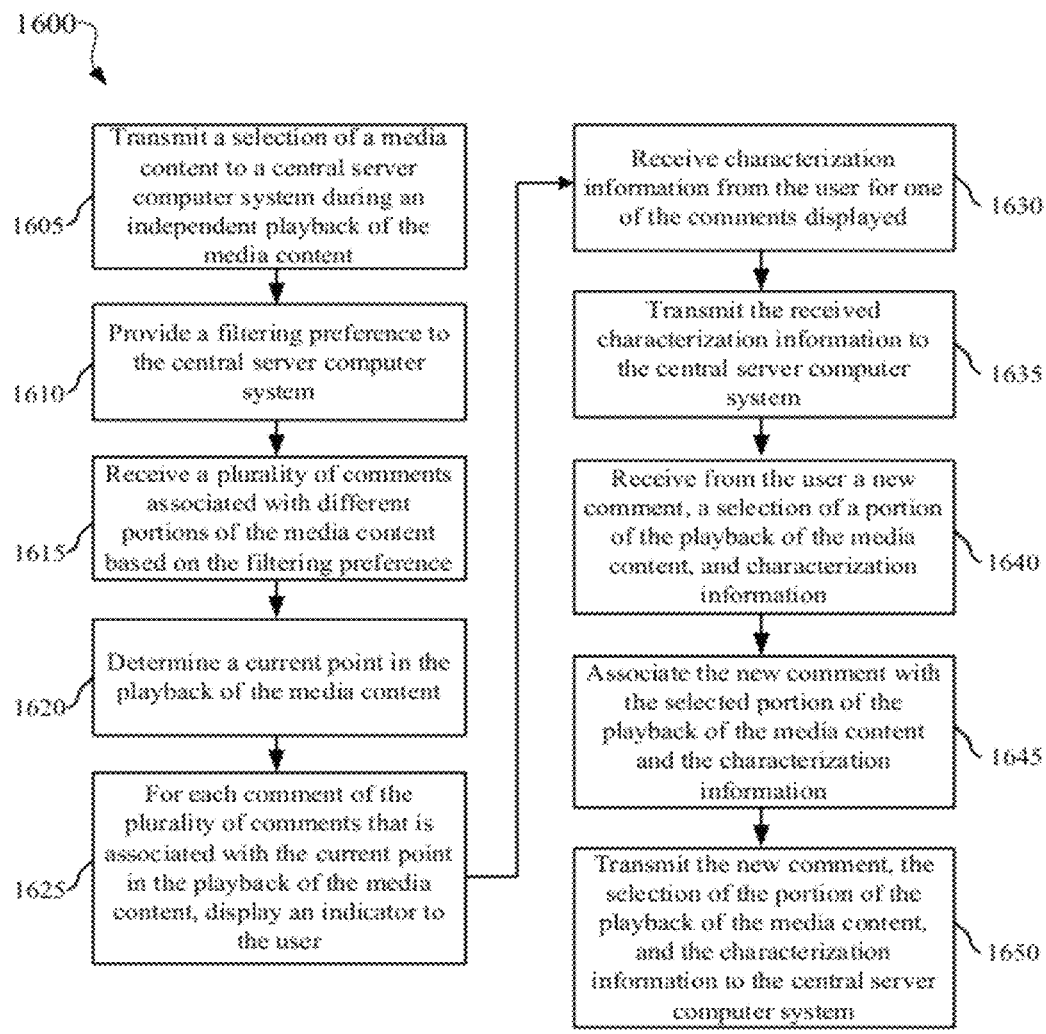
FIG. 16 is a flowchart diagram of an example method of associating comments with playback of media content according to various embodiments of the invention.

Referring now to FIG. 16, a flowchart diagram is shown of an example method 1600 of associating comments with playback of media content. The method 1600 may be performed, for example, by a device performing the functions of both the input device 105 of FIG. 1, 5, or 7, and the output device 125 of FIG. 1, 8, or 9. At block 1605, a selection of a media content is transmitted to a central server computer system during an independent playback of the media content. At block 1610, a filtering preference is provided to the central server computer system. At block 1615, a plurality of comments associated with different portions of the media content are received based on the filtering preference. At block 1620, a current point in the playback of the media content is determined. At block 1625, for each comment of the plurality of comments which is associated with the current point in the playback of the media content, an indicator is displayed to the user.

At block 1630, characterization information for one of the comments displayed is received from the user. At block 1635, the received characterization information is transmitted to the central server computer system. At block 1640, a new comment, a selection of a portion of the playback of the media content, and characterization information for the comment are received from the user. At block 1645, the new comment is associated with the selected portion of the playback of the media content and the characterization information. At block 1650, the new comment, the selection of the portion of the playback of the media content, and the characterization information are transmitted to the central server computer system.

Figure 17:
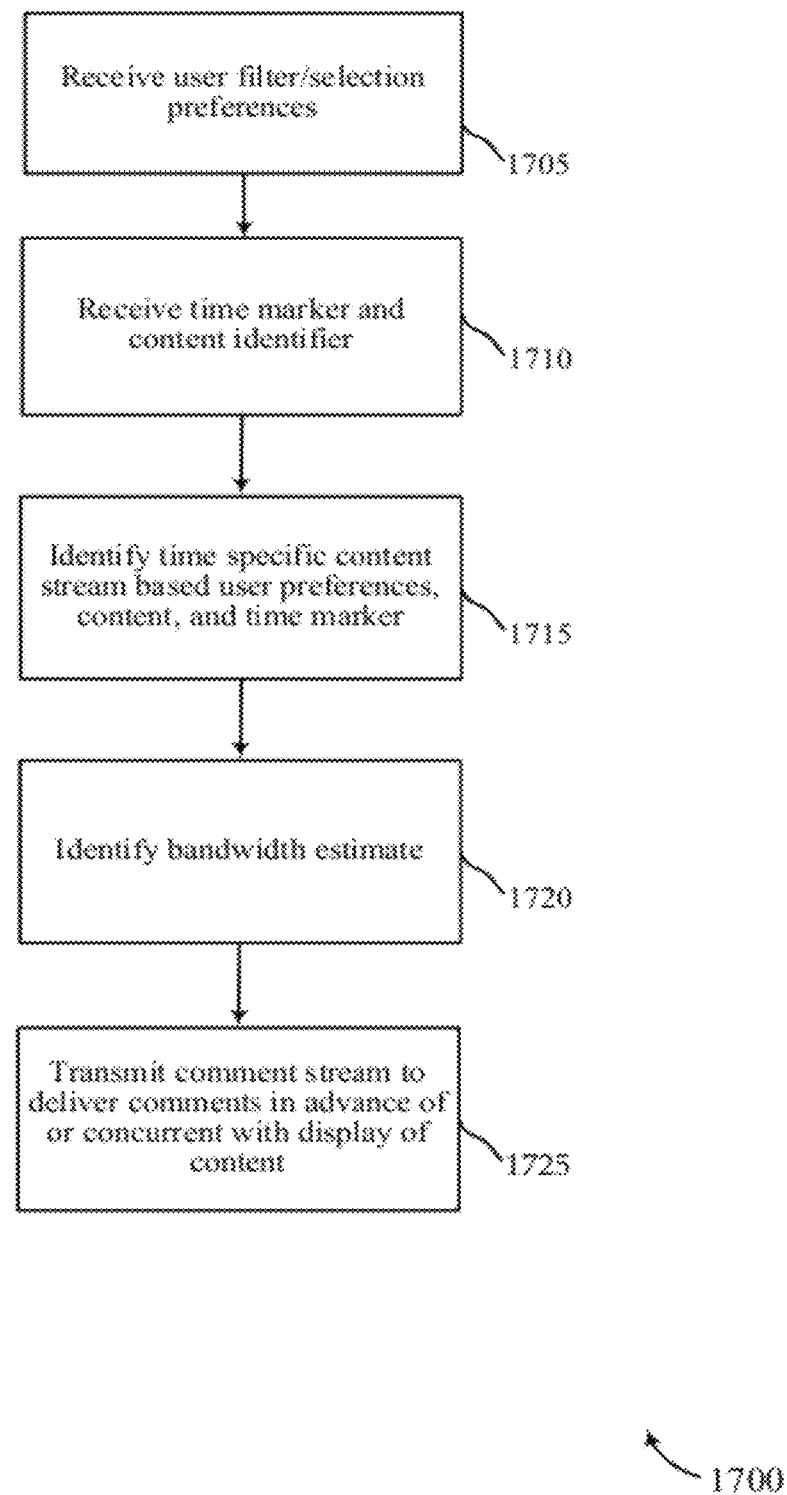
FIG. 17 is a flowchart diagram of an example method of associating comments with playback of media content according to various embodiments of the invention.

FIG. 17 is a flowchart 1700 of a method for pre-caching comments for possible selection and display according to various embodiments of the invention. The method 1700 may be performed, for example, in whole or in part, by the central server computer system 115 of FIG. 1, 5, 6A, 6B, or 8, the output device the output device 125 of FIG. 1, 8, or 9, or any combination thereof.

At block 1705, user filter/selection preferences are received. A user may make selections about comment types, comment forms, commentators, user ratings, noise tolerance, etc. to filter the range of comments associated with the content. At block 1710, a time marker and content identifier are received, so as to identify the time location within the content being played. At block 1715, a time specific content stream may be identified based on user preferences, the content, and the time marker. At block 1720, a bandwidth estimate may be identified (e.g., between a central server computer system and an output device). At block 1725, a comment stream is delivered for pre-caching to deliver comments in advance of or concurrent with display of content.

Figure 18:
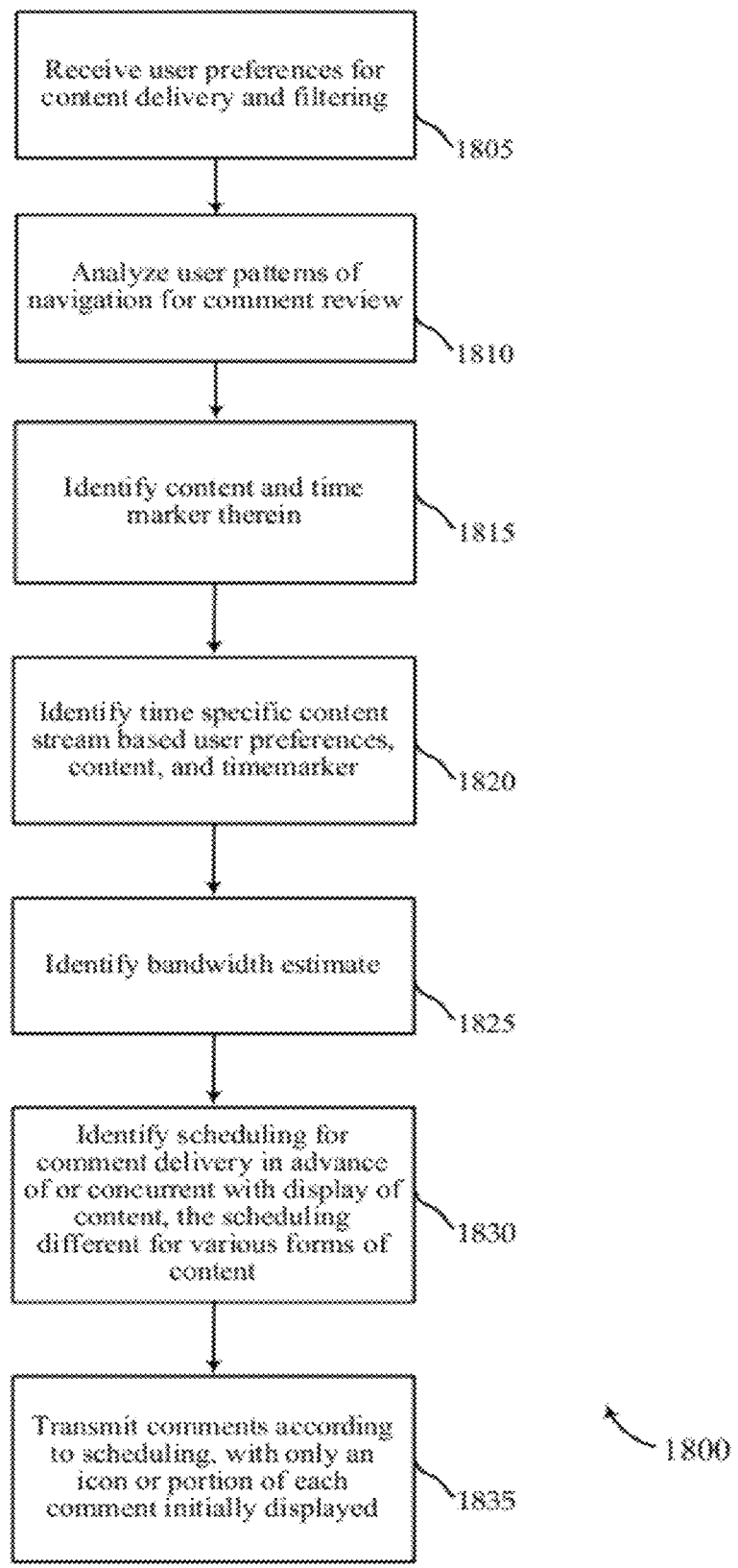
FIG. 18 is a flowchart diagram of an example method of associating comments with playback of media content according to various embodiments of the invention.

FIG. 18 is a flowchart 1800 of an alternative method for pre-caching comments for possible selection and display according to various embodiments of the invention. The method 1800 may be performed, for example, in whole or in part, by the central server computer system 115 of FIG. 1, 5, 6A, 6B, or 8, the output device the output device 125 of FIG. 1, 8, or 9, or any combination thereof.

At block 1805, user preferences for comment delivery (e.g., pre-caching preferences) and filtering are received. At block 1810, user patterns of navigation for comment review are analyzed, so that trends may be identified to provide for more targeted and efficient pre-caching. At block 1815, a time marker and content identifier are received, so as to identify the time location within the content being played. At block 1820, a time specific content stream may be identified based on user preferences, the content, and the time marker. At block 1825, a bandwidth estimate may be identified (e.g., between a central server computer system and an output device). At block 1830, the scheduling for comment delivery is determined, so that comments are delivered in advance of or concurrent with display of content, the scheduling different for various forms of content (e.g., different scheduling and lead times for text, audio, video, etc.). At block 1835, comments are transmitted according to the identified schedule, with only an icon or portion of each comment initially displayed.

User history may be analyzed, and comments may be pre-cached based on known or predictable routes through meta-media or other user trends. In one example, the depth of comments downloaded for pre-caching depends on user history in reviewing those comments. If the analysis indicates that a user is more likely to explore certain forms of comments (e.g., text only, music, images, video, certain commentators), those forms of content may be pre-cached to a more significant degree than others.

Figure 19:
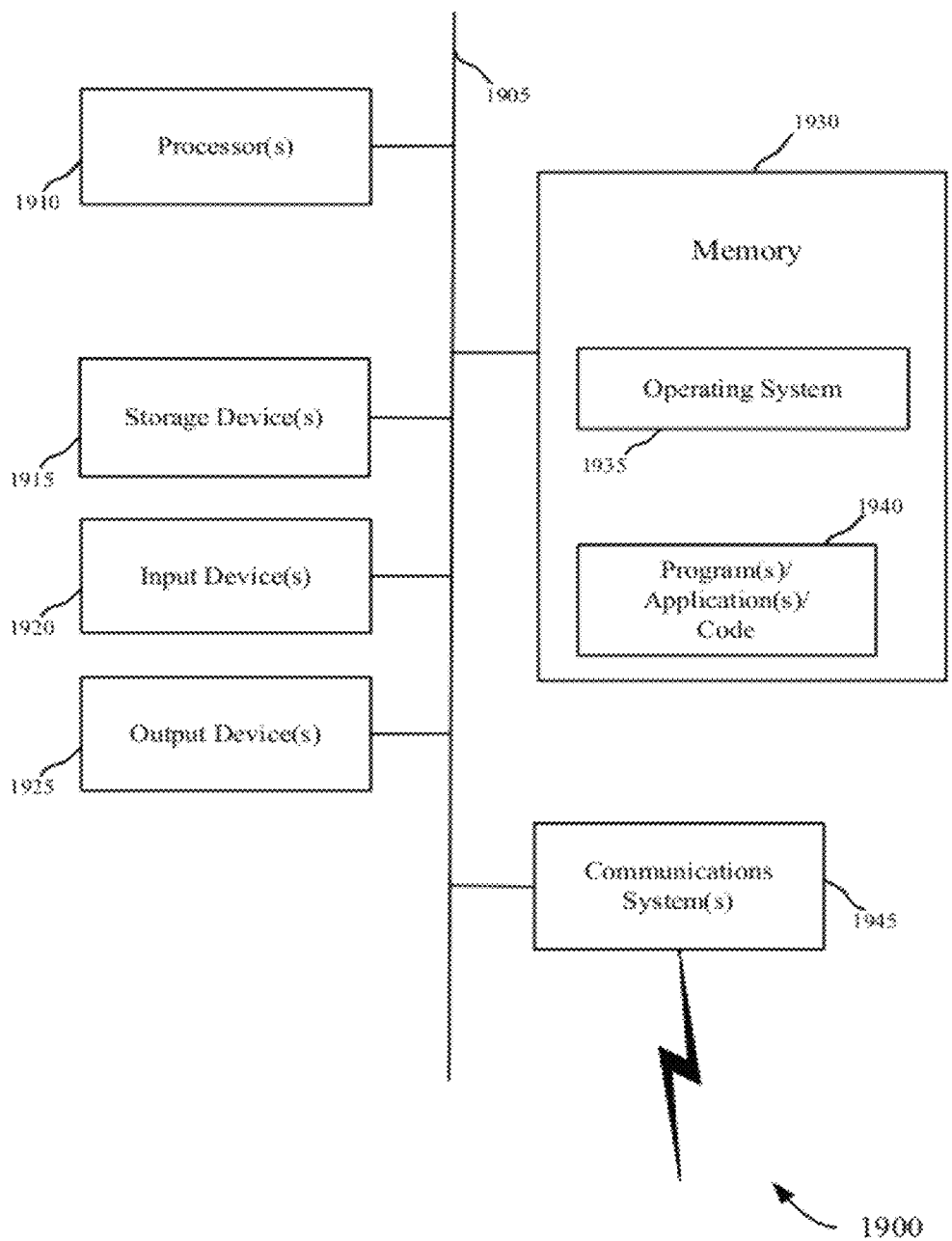
FIG. 19 is a schematic diagram that illustrates a representative device structure that may be used in various embodiments of the present invention.

A device structure 1900 that may be used for one or more input devices 105, the central server computer system 115, for one or more output devices 125, or for other computing devices described herein, is illustrated with the schematic diagram of FIG. 19. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1905, including processor(s) 1910 (which may further comprise a DSP or special-purpose processor), storage device(s) 1915, input device(s) 1920, and output device(s) 1925. The storage device(s) 1915 may be a machine-readable storage media reader connected to any machine-readable storage medium, the combination comprehensively representing remote, local, fixed, or removable storage devices or storage media for temporarily or more permanently containing computer-readable information. The communications system(s) interface 1945 may interface to a wired, wireless, or other type of interfacing connection that permits data to be exchanged with other devices. The communications system(s) interface 1945 may permit data to be exchanged with a network.

The structure 1900 may also include additional software elements, shown as being currently located within working memory 1930, including an operating system 1935 and other code 1940, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

What is claimed is:

1. A method of associating comments with playback of media content, the method comprising:
   storing, by a central server computer system:
   a first plurality of comments received from a plurality of input devices, wherein each of the first plurality of comments is associated with a first timeline unit of a first media content, and
   a second plurality of comments received from the plurality of input devices, wherein each comment of the second plurality of comments is associated with a second timeline unit of the first media content or a third timeline unit of a second media content, and wherein the second timeline unit and the third timeline unit are outside time boundaries of the first timeline unit;
   receiving a selection of the first media content at the central server computer system for playback at an output device;
   identifying a subset of the first plurality of comments and a subset of the second plurality of comments based at least in part on a user preference received from the output device, wherein aspects of the identified subset of the first plurality of comments are associated with aspects of the identified subset of the second plurality of comments; and
   transmitting, to the output device, the identified subset of the first plurality of comments, the identified subset of the second plurality of comments, and the first timeline unit from the central server computer system, wherein the identified subset of the first plurality of comments and the identified subset of the second plurality of comments are presented during playback of the first timeline unit by the output device.

2. The method of claim 1, further comprising:
   determining a current point in the playback of the first media content;
   wherein the transmitting the identified subset of the first plurality of comments and the identified subset of the second plurality of comments to the output device comprises streaming identified comments from the first plurality of comments and the second plurality of comments associated with the playback of the of the first timeline unit of the first media content to the output device.

3. The method of claim 1, further comprising:
   determining a current point in the playback of the first media content;
   wherein the transmitting the identified subset of the first plurality of comments and the identified subset of the second plurality of comments to the output device comprises streaming comments associated with the playback of other timeline units of the first media content to the output device for pre-caching.

4. The method of claim 1, further comprising:
   storing characterization information for each comment of the first plurality of comments and the second plurality of comments in a data store.

5. The method of claim 4, further comprising:
   receiving a filtering preference from the output device;
   filtering the first plurality of comments and the second plurality of comments into the subset of the first plurality of comments and the subset of the second plurality of comments based on the stored characterization information for each comment and the filtering preference.

6. The method of claim 5, wherein:
   the characterization information for at least one comment of the first plurality of comments and the second plurality of comments comprises category information associated with the at least one comment; and
   the filtering preference comprises at least one of: a selected category of comment or a selected category of comment author.

7. The method of claim 4, further comprising:
   receiving the characterization information for at least one comment of the first plurality of comments and the second plurality of comments from an input device of the plurality of input devices.

8. The method of claim 7, further comprising:
   receiving the at least one comment and the characterization information for the at least one comment from the same input device.

9. The method of claim 7, further comprising:
   receiving the at least one comment from a first input device of the plurality of input devices; and
   receiving characterization information for the at least one comment from a second input device of the plurality of input devices.

10. The method of claim 4, further comprising:
generating the characterization information for at least one comment of the first plurality of comments and the second plurality of comments at the central server computer system by applying a set of rules to the at least one comment.

11. The method of claim 4, wherein
the characterization information for at least one comment is based on an at least one of an author of the at least one comment or a content of the at least one comment.

12. A method of associating comments with playback of media content, the method comprising:
receiving from a user at an input device a comment during a first timeline unit of a first media content being played on an output device, wherein the input device and the output device comprise separate processors;
receiving at the input device characterization information generated for the comment;
associating the comment with the first timeline unit of the first media content being played on the output device and the characterization information generated for the comment; and
receiving from the user at the input device an association of the comment with a second timeline unit of the first media content or a third timeline unit of a second media content, wherein the second timeline unit and the third timeline unit are outside time boundaries of the first timeline unit, and
associating the comment with one or more comments associated with the second timeline unit or the third timeline unit, wherein aspects of the comment are associated with aspects of the one or more comments.

13. The method of claim 12, wherein:
the receiving at the input device the characterization information generated for the comment comprises receiving the characterization information from the user at the input device.

14. The method of claim 12, further comprising:
generating the characterization information at the input device based on at least one of an author of the comment or a content of the comment.

15. The method of claim 14, further comprising:
applying a set of rules to the comment to generate the characterization information for the comment.

16. A method of associating comments with playback of media content, the method comprising:
receiving a first plurality of comments and a second plurality of comments from a central server computer system at an output device, wherein the first plurality of comments is associated with a first timeline unit of the first media content and the second plurality of comments is associated with a second timeline unit of the first media content or a third timeline unit of a second media content, and wherein the second timeline unit and the third timeline unit are outside time boundaries of the first timeline unit;
identifying a selection, from a user, of a subset of the first plurality of comments and a subset of the second plurality of comments from an input device, wherein aspects of the identified subset of the first plurality of comments are associated with aspects of the identified subset of the second plurality of comments;
identifying at the output device that the first timeline unit of the first media content is being played back at the output device; and
displaying to the user of the output device an indication of the subset of the first plurality of comments and the subset of the second plurality of comments during playback of the first timeline unit.

17. The method of claim 16, further comprising:
receiving at least one comment filtering preference from the user of the output device.

18. The method of claim 17, wherein the comment filtering preference comprises at least one of: a selected category of comment or a selected category of comment author.

19. The method of claim 17, further comprising:
transmitting the at least one filtering preference from the output device to the central server computer system;
wherein each comment of the first plurality of comments and the second plurality of comments received at the output device satisfies the at least one filtering preference.

20. The method of claim 17, further comprising:
receiving characterization information for each of the first plurality of comments and the second plurality of comments from the central server computer system;
applying a set of filtering rules to the first plurality of comments and the second plurality of comments received from the central server computer system to enforce the at least one filtering preference based on the characterization information for the first plurality of comments and the second plurality of comments;
wherein the indication of the subset of the first plurality of comments and the second plurality of comments comprises an indication of each comment of the first plurality of comments and the second plurality of comments that is associated with the first timeline unit of the playback of the first media content and complies with the at least one filtering preference.

21. The method of claim 1, wherein identifying the subset of the second plurality of comments is based at least in part on user-adjusted commentary tolerance.

22. The method of claim 1, further comprising:
analyzing associations, made by a user, between the first timeline unit of the first media content and the second timeline unit of the first media content or the third timeline unit of the second media content, wherein identifying the subset of the second plurality of comments associated with the first timeline unit of the first media content is based at least in part on the analyzing.

23. The method of claim 22, wherein analyzing the associations comprises:
determining a strength of an association between a first comment of the first plurality of comments and a second comment of the second plurality of comments.

24. The method of claim 1, further comprising:
receiving, from a user, a first comment of the first plurality of comments comprising a first highlighted portion; and
identifying a comment of the second plurality of comments associated with the first comment based at least in part on the highlighted portion.

25. The method of claim 24, wherein identifying the comment of the second plurality of comments comprises identifying the user associated with the first comment and a related comment made by the user associated with the second timeline unit of the first media content or the third timeline unit of the second media content.

* * * * *